United States Patent [19]

King et al.

[11] Patent Number: 5,410,656

[45] Date of Patent: Apr. 25, 1995

[54] WORK STATION INTERFACING MEANS HAVING BURST MODE CAPABILITY

[75] Inventors: Edward C. King, Fremont, Calif.; Anton Goeppel, Burgau, Germany

[73] Assignee: NCR Corporation, Dayton, Ohio

[21] Appl. No.: 752,383

[22] Filed: Jun. 30, 1991

[30] Foreign Application Priority Data

Aug. 31, 1990 [GB] United Kingdom ............... 9018993

[51] Int. Cl.⁶ ................................. G06F 13/18
[52] U.S. Cl. .................... 395/325; 364/DIG. 1;
364/228.1; 364/229.2; 364/230.1; 364/230.2;
364/238.3; 364/240.1; 364/240.5; 364/240.9;
364/241.2; 364/242.31; 364/242.6; 364/242.7;
364/242.91; 364/242.92; 364/246.91; 395/200
[58] Field of Search ............... 395/250, 325, 425, 725,
395/800, 550, 555, 700; 364/200; 370/85.6

[56] References Cited

U.S. PATENT DOCUMENTS

| | | | |
|---|---|---|---|
| 4,344,132 | 8/1982 | Dixon et al. | 395/250 |
| 4,370,712 | 1/1983 | Johnson et al. | 364/200 |
| 4,542,457 | 9/1985 | Mortensen et al. | 345/275 |
| 4,701,845 | 10/1987 | Andreasen et al. | 364/200 |
| 4,777,591 | 10/1988 | Chang et al. | 395/800 |
| 4,782,439 | 11/1988 | Borkar et al. | 395/425 |
| 4,814,970 | 3/1989 | Barbagelaton et al. | 395/325 |
| 4,864,532 | 9/1989 | Reeve et al. | 395/250 |
| 4,912,631 | 3/1990 | Lloyd | 395/425 |
| 4,965,717 | 10/1990 | Cutts, Jr. et al. | 395/325 |
| 4,987,529 | 1/1991 | Craft et al. | 395/325 |
| 5,072,369 | 12/1991 | Theus et al. | 395/425 |
| 5,073,969 | 12/1991 | Shoemaker | 395/725 |
| 5,089,953 | 2/1992 | Ludicky | 395/425 |
| 5,101,479 | 3/1992 | Baker et al. | 395/325 |
| 5,117,350 | 5/1992 | Parrish et al. | 395/425 |
| 5,129,062 | 7/1992 | Gygi et al. | 395/725 |
| 5,134,699 | 7/1992 | Aria et al. | 395/425 |
| 5,151,986 | 9/1992 | Langan et al. | 395/550 |
| 5,163,048 | 11/1992 | Heutink | 370/85.6 |
| 5,193,175 | 3/1993 | Cutts, Jr. et al. | 395/575 |

Primary Examiner—Allen R. MacDonald
Assistant Examiner—Tarig Hafiz
Attorney, Agent, or Firm—Douglas S. Foote

[57] ABSTRACT

A work station, including a central processing unit (CPU), first, second and third integrated circuit interface chips, connected to an external bus, memory and peripheral unit, respectively, and a local bus, coupled to the CPU and chips. Each chip includes an internal bus interconnecting operating units disposed therein. Each chip is adapted to operate at the same clock frequency as the CPU, but with operational signals generated on its respective internal bus independently of the CPU. The internal bus on the first chip includes a burst mode control line for selected operating units. An operating unit obtaining access to the internal bus and activating its burst mode control line is effective to lock the internal bus for a plurality of operating cycles, during which data is transferred continuously in a burst mode over the internal bus.

12 Claims, 19 Drawing Sheets

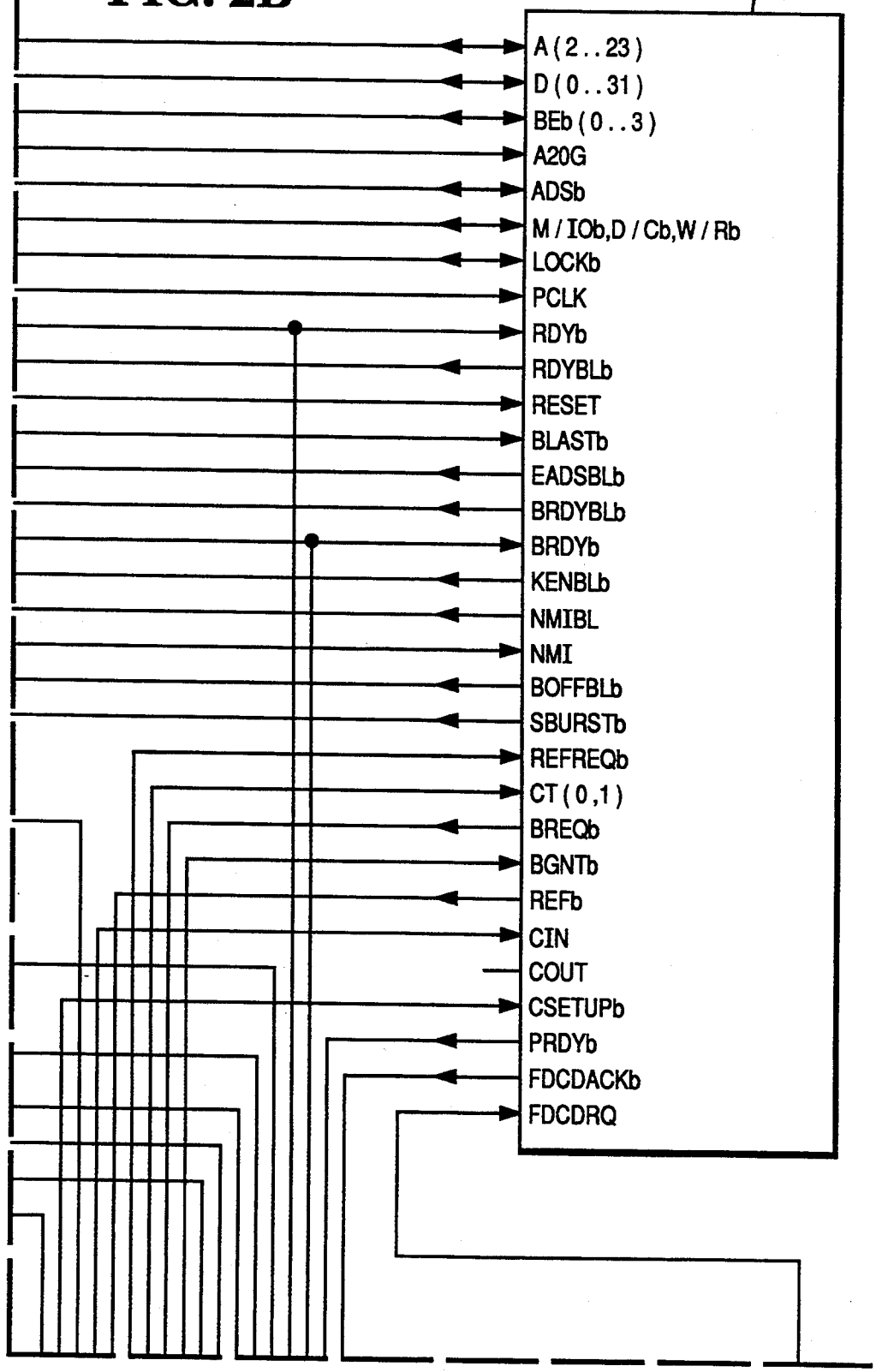

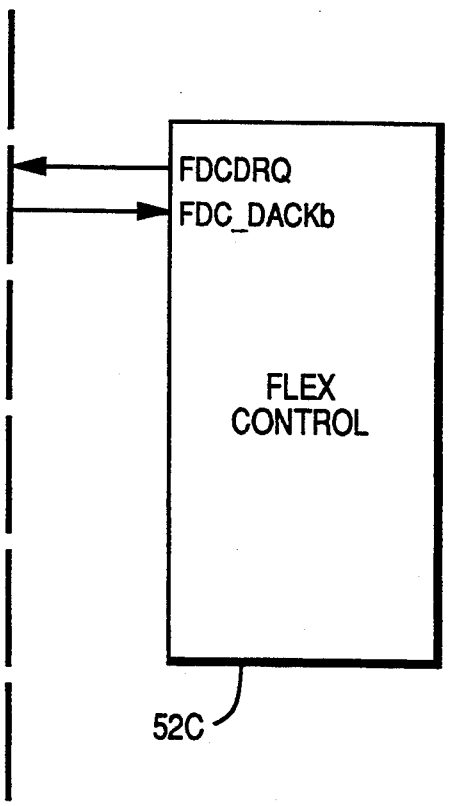
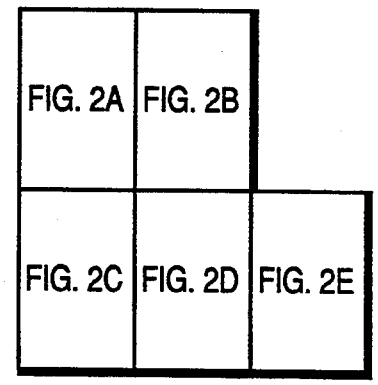
FIG. 2E
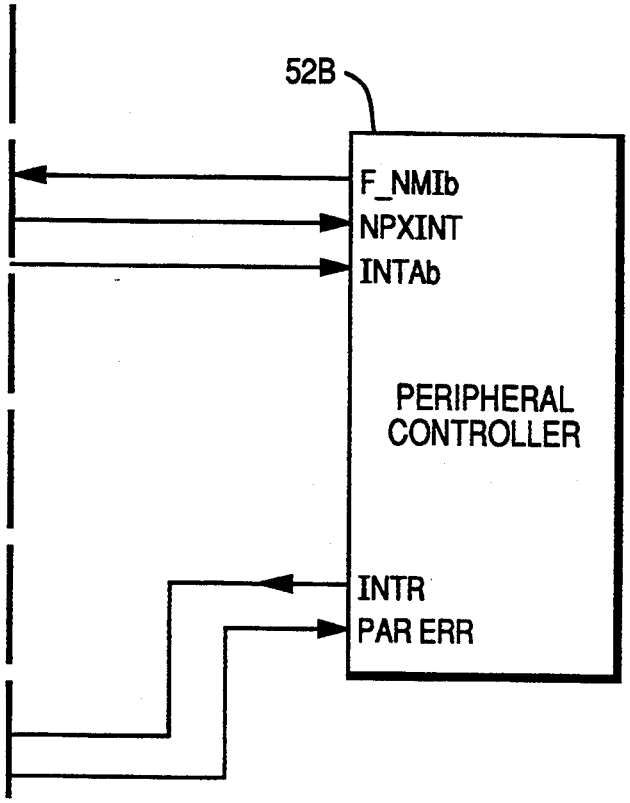

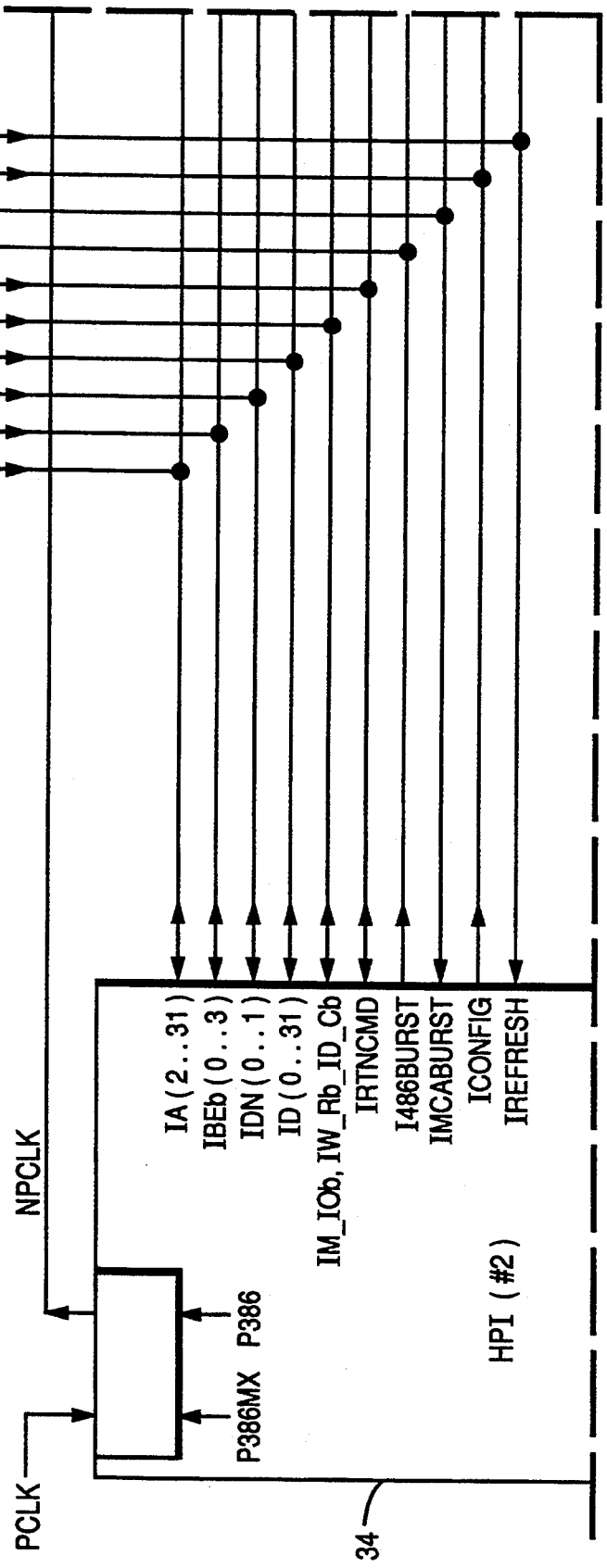

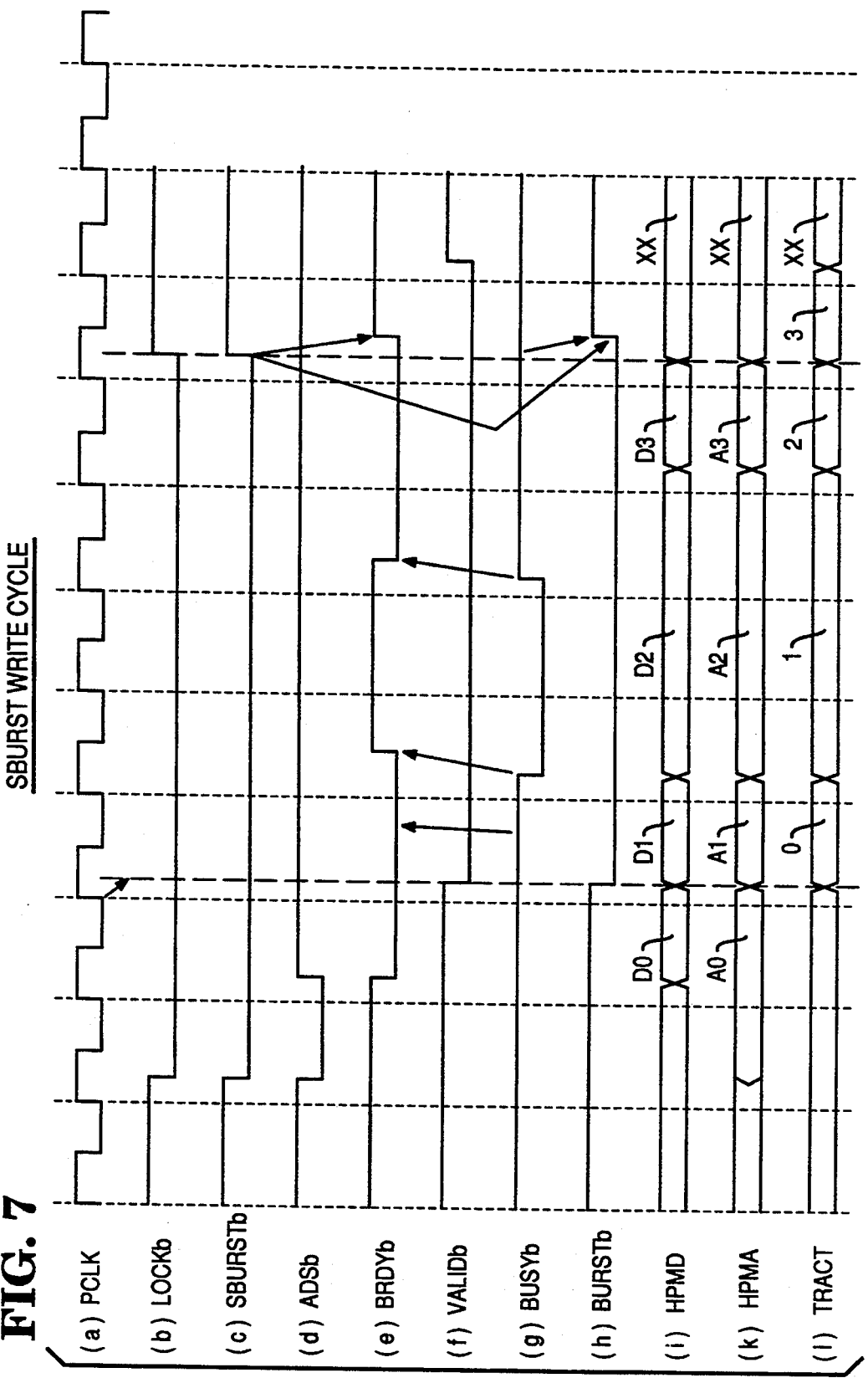
FIG. 7 SBURST WRITE CYCLE

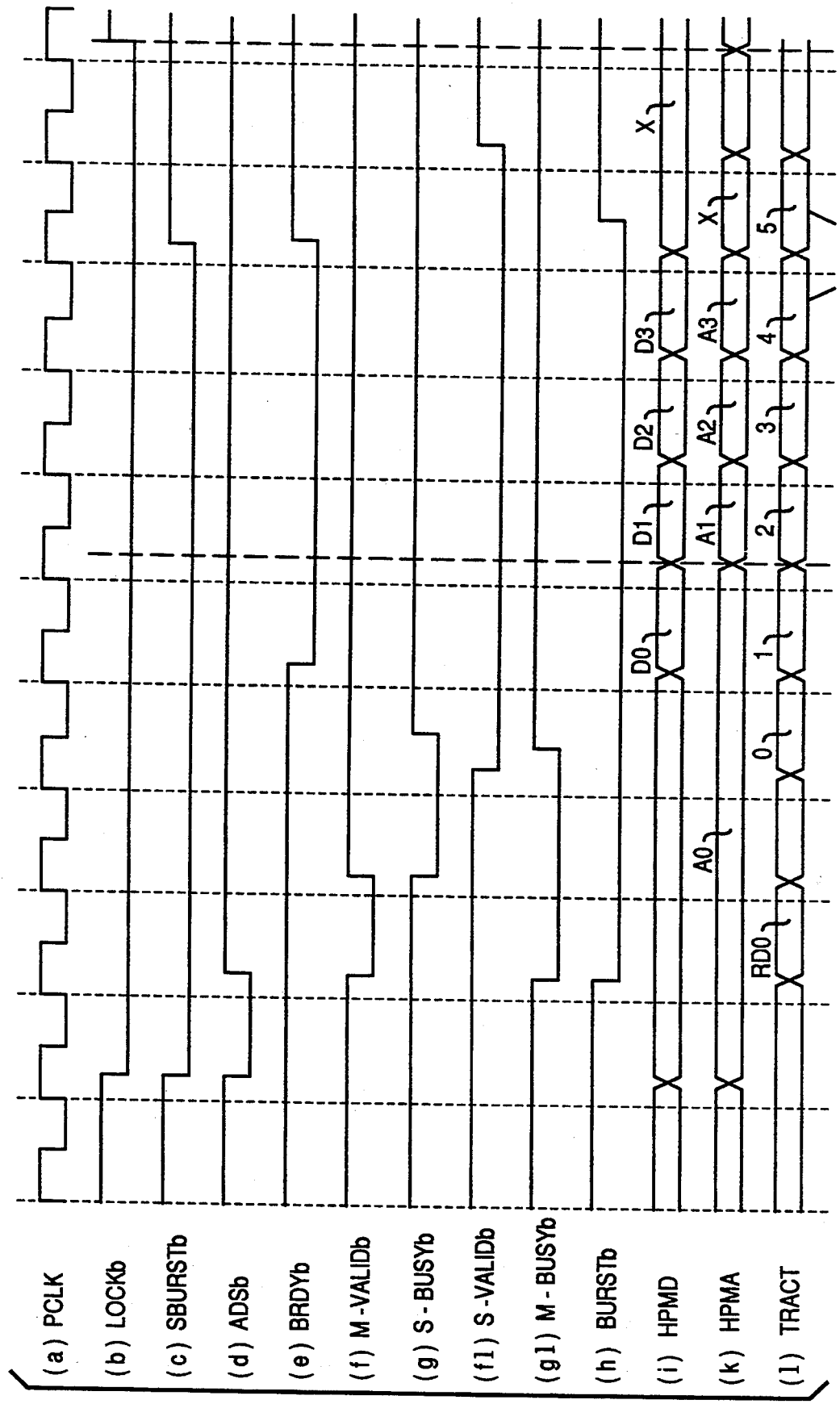
FIG. 8 SBURST READ CYCLE

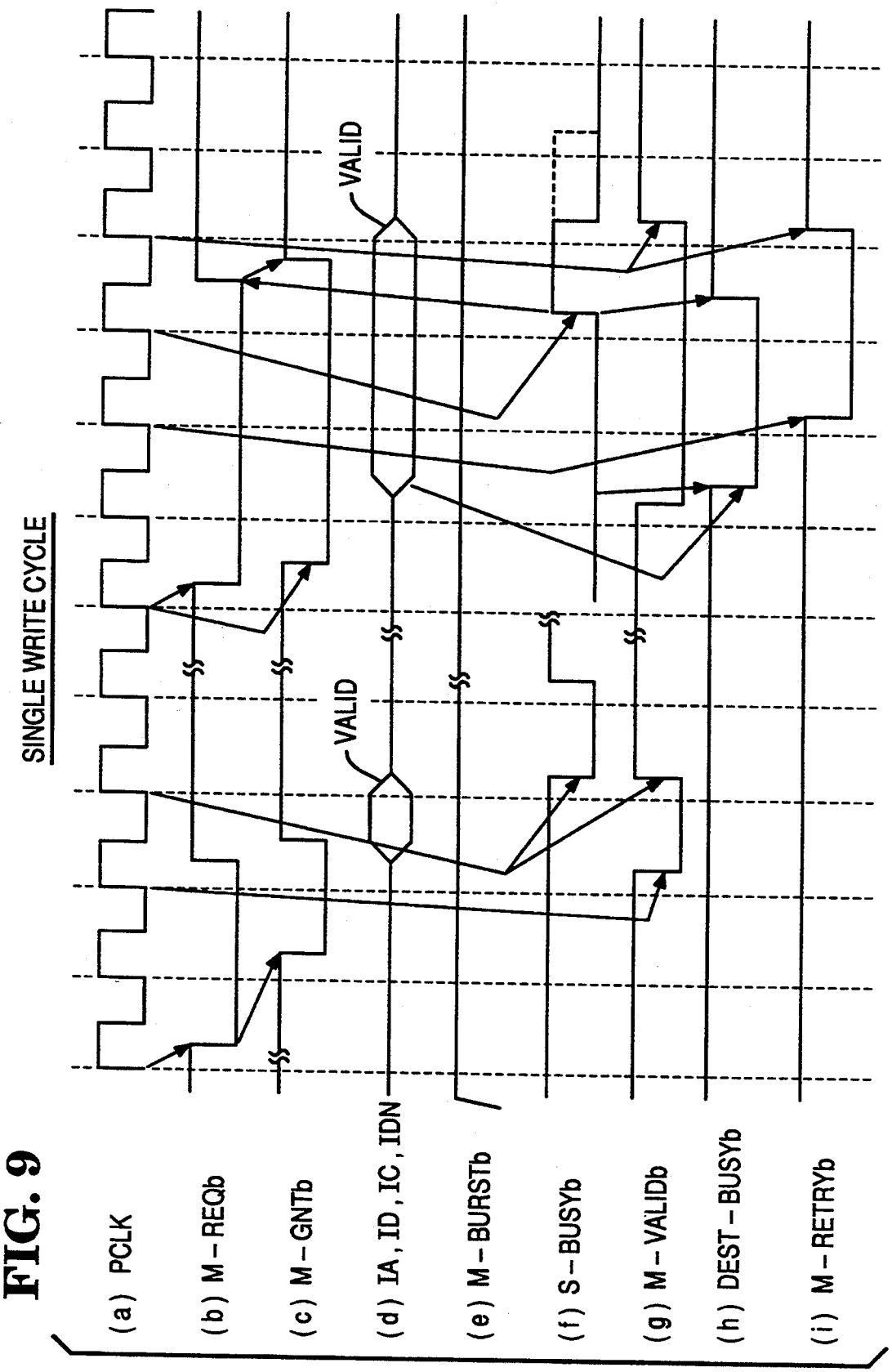

WORK STATION INTERFACING MEANS HAVING BURST MODE CAPABILITY

This invention relates to a work station or similar data processing system of the kind including a central processing unit (CPU). More particularly, it relates to an architecture for such data processing system.

CROSS-REFERENCE TO RELATED APPLICATIONS

"Work Station Having Multiprocessing Capability", U.S. patent application Ser. No. 752,747, filed concurrently herewith, invented by Otto Duerrschmid and Edward C. King.

"Work Station or Similar Data Processing System Including Interfacing Means to Microchannel Means", U.S. patent application Ser. No. 752,710, filed concurrently herewith, invented by V. Thomas Powell, Anton Goeppel, Edward C. King and G. Roerhl.

"Work Station Including a Direct Memory Access Controller and Interfacing Means to Microchannel Means", U.S. patent application Ser. No. 753,273, filed concurrently herewith, invented by Georg Dollinger and Edward C. King.

"Work Station and Method for Configuring Thereof", U.S. patent application Ser. No. 752,814, filed concurrently herewith, invented by Anton Goeppel.

"Internal Bus for Work Station Interfacing Means", U.S. patent application Ser. No. 752,371, filed concurrently herewith, invented by Edward C. King and Anton Goeppel.

"Work Station Architecture With Selectable CPU", U.S. patent application Ser. No. 752,819, filed concurrently herewith, invented by Edward C. King and Anton Goeppel.

"Register Control for Workstation Interfacing Means", U.S. patent application Ser. No. 752,727, filed concurrently herewith, invented by Anton Goeppel.

"Work Station Having Multiplexing and Burst Mode Capabilities", U.S. patent application Ser. No. 752,407, filed concurrently herewith, invented by Anton Goeppel and Edward C. King.

"Work Station Including a Direct Memory Access Controller", U.S. patent application Ser. No. 752,815, filed concurrently herewith, invented by Anton Goeppel.

BACKGROUND OF THE INVENTION

Known work stations use a specific CPU, e.g. an Intel 80386 microprocessor provided on a system board together with other chip units such as memories, various peripheral interfaces and a system bus controller. The CPU and the above mentioned units communicate with each other, partially through buffers, over a local bus comprising control, address and data lines, all units being under tight control of the CPU through the local bus. In general, the system design is tailored for the specific CPU. This means that a large variety of different chip units are required for work stations using different CPUs. The local bus also is tailored for the specific configuration. In order to maintain compatibility with other systems, detailed specifications rigidly determine the features and functions of the various units and their I/O registers. Thus, it is difficult to modify the system for expansion and improved performance.

Specifically, any communication such as writing to or reading from memories is completely controlled by the CPU or any other unit adapted to be bus master for the local bus. This means that functions relating to a specific unit only, such as refreshing of memories or clearing of overflow situations in cache memories are performed under control of the CPU resulting in a time consuming procedure with many interruptions of normal processing.

OBJECTS OF THE INVENTION

It is an object of the present invention to provide a new and improved architecture for a workstation.

It is another object of the present invention to provide a work station operating with fewer wait states and having a rapid data transfer rate capability.

It is a further object of the present invention to provide a work station having a plurality of chips connected to a CPU and which are capable of handling data transfers independently of the CPU.

SUMMARY OF THE INVENTION

One form of the present invention is a work station, including a central processing unit (CPU), first, second and third integrated circuit interface chips connected to an external bus, memory and peripheral unit, respectively, and a local bus, coupled to the CPU and chips. Each chip includes an internal bus interconnecting operating units disposed therein. The internal bus on the first chip includes a burst mode control line for selected operating units. An operating unit obtaining access to the internal bus and activating its burst mode control line is effective to lock the internal bus for a plurality of operating cycles, during which data is transferred continuously in a burst mode over the internal bus.

The subject work station comprises highly integrated functional blocks provide with some intelligence and register means, capable of flexibly combining with different types of CPUs. Each functional block serves as an active interface either for memory control (MIB), Micro Channel control (BIB) or local peripheral control (PIB). One or a plurality of MIBs or BIBs and one PIB communicate through a local bus with a selected CPU.

The local bus is specifically extended as compared with the local bus of known work stations in order to provide more flexibility and improved performance.

In particular, the local bus comprises additional lines CT(0 . . . 1) for selecting the type of processor which has access to the local bus (host P/M bus). Additionally, up to four MIBs or BIBs may reside on the host P/M bus using a corresponding request signal BREQb(0 . . . 3) and a corresponding grant signal BGNT(0 . . . 3) which serve to select an active functional block. Since only BIBs may be bus masters, only they need a BREQb line. Furthermore, the host P/M bus routes burst signals generated by one of the functional blocks (BIB) to other functional blocks (MIB or PIB). This is specifically applicable for a streaming mode in read/write operations between a Micro Channel and the memory where the BIB functional block assumes the role of a bus master sending data through the MIB functional unit to the memory.

Each functional block comprises an internal transaction bus enabling communication between the individual units within the functional block. Specifically, each functional block such as a BIB may internally operate in a BURST mode for continuous data transfer between operational units of the functional block through the internal transaction bus. For example, such a unit may be a direct memory access controller (DMA).

The internal transaction bus operates independently from the main system bus but with the same frequency as the host CPU through a standardized host/transaction bus interface (HPI) used in all functional blocks. Read and write operations are performed on a master/slave basis in one cycle each with a specific improved performance for read cycles: after a one cycle read request by a master the slave independently returns the requested data in one cycle as soon as it is ready.

One embodiment of the present invention will now be described by way of example, with reference to the accompanying drawings.

BRIEF DESCRIPTION OF THE DRAWINGS

FIGS. 2A to 2E, arranged as shown in FIG. 2, are a schematic showing in detail a host P/M bus as used to connect the various functional blocks with each other.

FIGS. 6A to 6D, arranged as shown in FIG. 6, are a schematic showing in detail the various lines of an internal transaction bus of a BIB.

FIG. 7 is a timing diagram used for an explanation of the operation of the work station according to the invention for a burst write cycle between two functional blocks.

FIG. 8 is a timing diagram used for an explanation of the operation of the work station according to the invention for a burst read cycle between two functional blocks.

FIG. 9 is a timing diagram used for an explanation of the operation of the work station according to the invention for a single write cycle.

DESCRIPTION OF A PREFERRED EMBODIMENT

Figure 1:
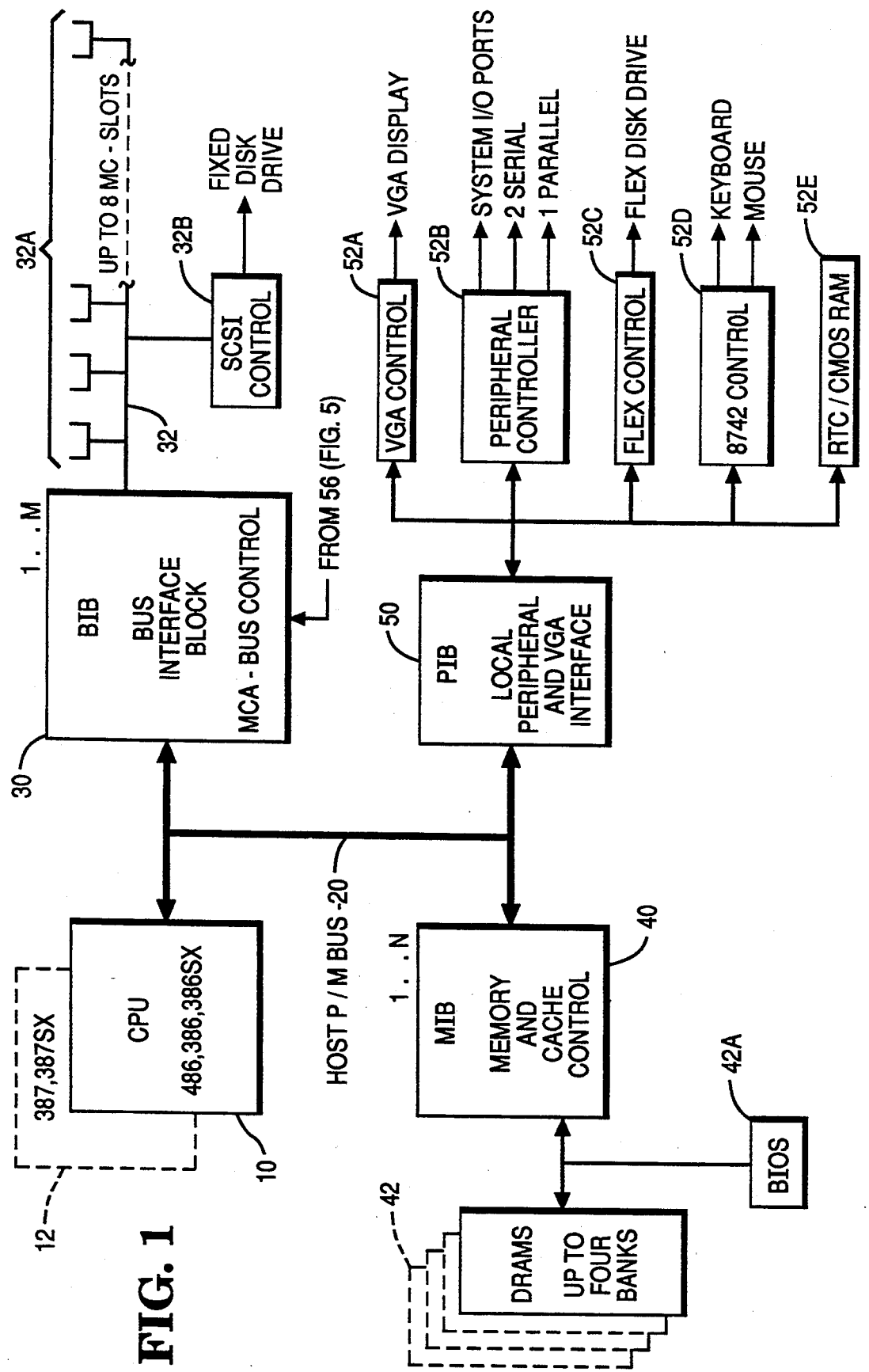
FIG. 1 is a schematic overall view of an embodiment of a work station according to the invention illustrating the various functional blocks and the connections therebetween.

FIG. 1 shows a preferred embodiment of a work station or data processing system according to the invention.

Basically, a CPU 10 communicates through a host P/M bus 20 with functional blocks 30, 40, and 50, and in particular with one or a plurality of bus interface blocks BIB 30 for access to one or plurality of bus means, which may be Micro Channel buses, with one or a plurality of memory interface blocks (MIB) 40 for memory and cache control and with a local peripheral and videographics array (VGA) interface block PIB 50. It should be noted that it is possible to provide more than one BIB 30 and more than MIB 40.

It should be noted that different types of microprocessors may be used for the CPU 10, such as the Intel 80386, 80386SX, and 80486 microprocessors. Also, a coprocessor 12, such as a mathematical coprocessor Intel 80387, or 80387SX, may be added.

Figure 3:
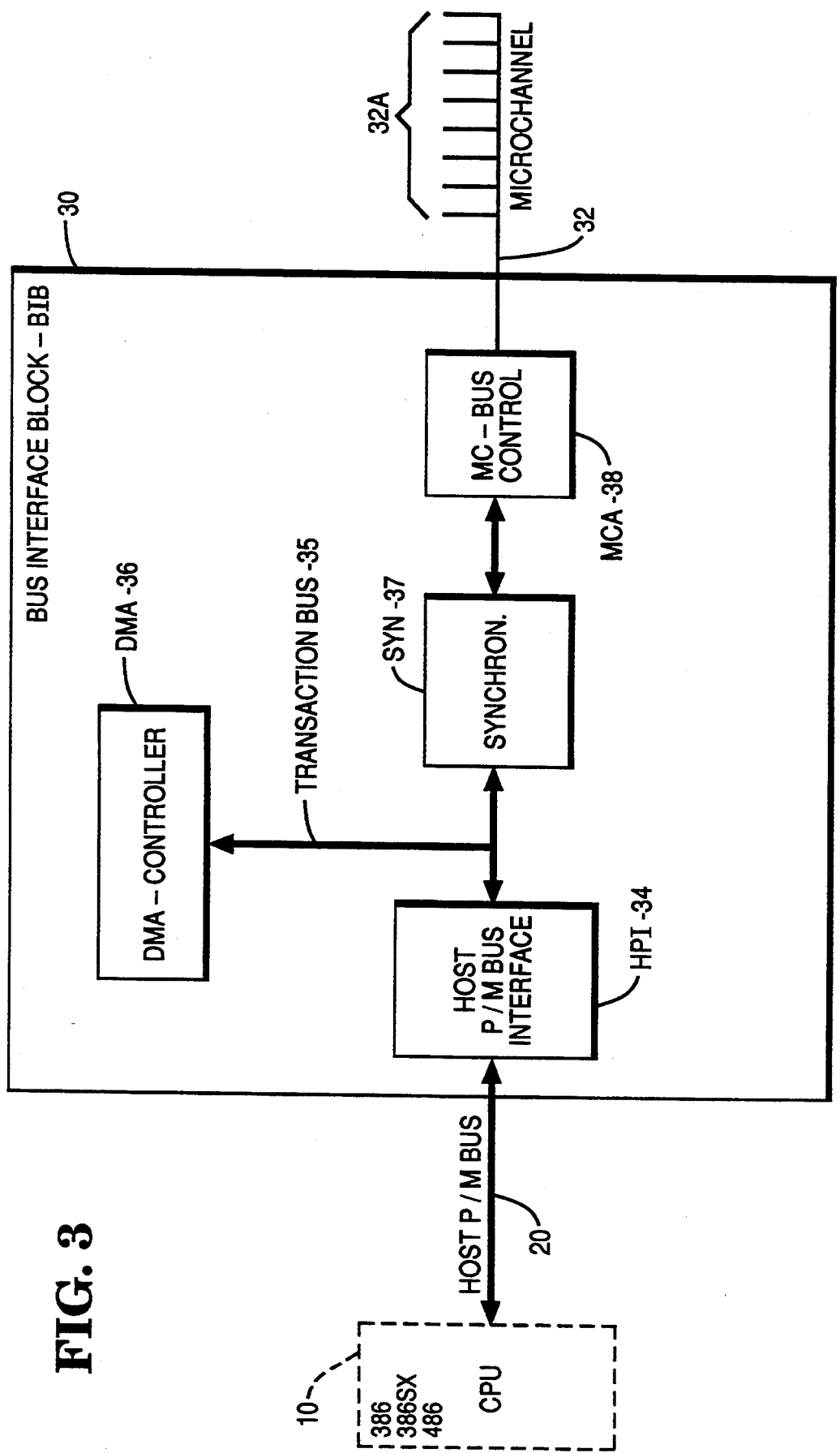
FIG. 3 is a block diagram of a bus interface block BIB.

Referring to FIGS. 1 and 3, the functional block BIB 30 is provided as an interface between the host P/M bus 20 and a Micro Channel bus 32 provided with a plurality of slots 32a for attaching conventional adapter boards including adapter boards provided with a microprocessor which may act as a master in communication with other functional blocks of the work station. Furthermore, a control 32b is connected to the Micro Channel bus 32 for controlling a fixed disk drive.

Figure 4:
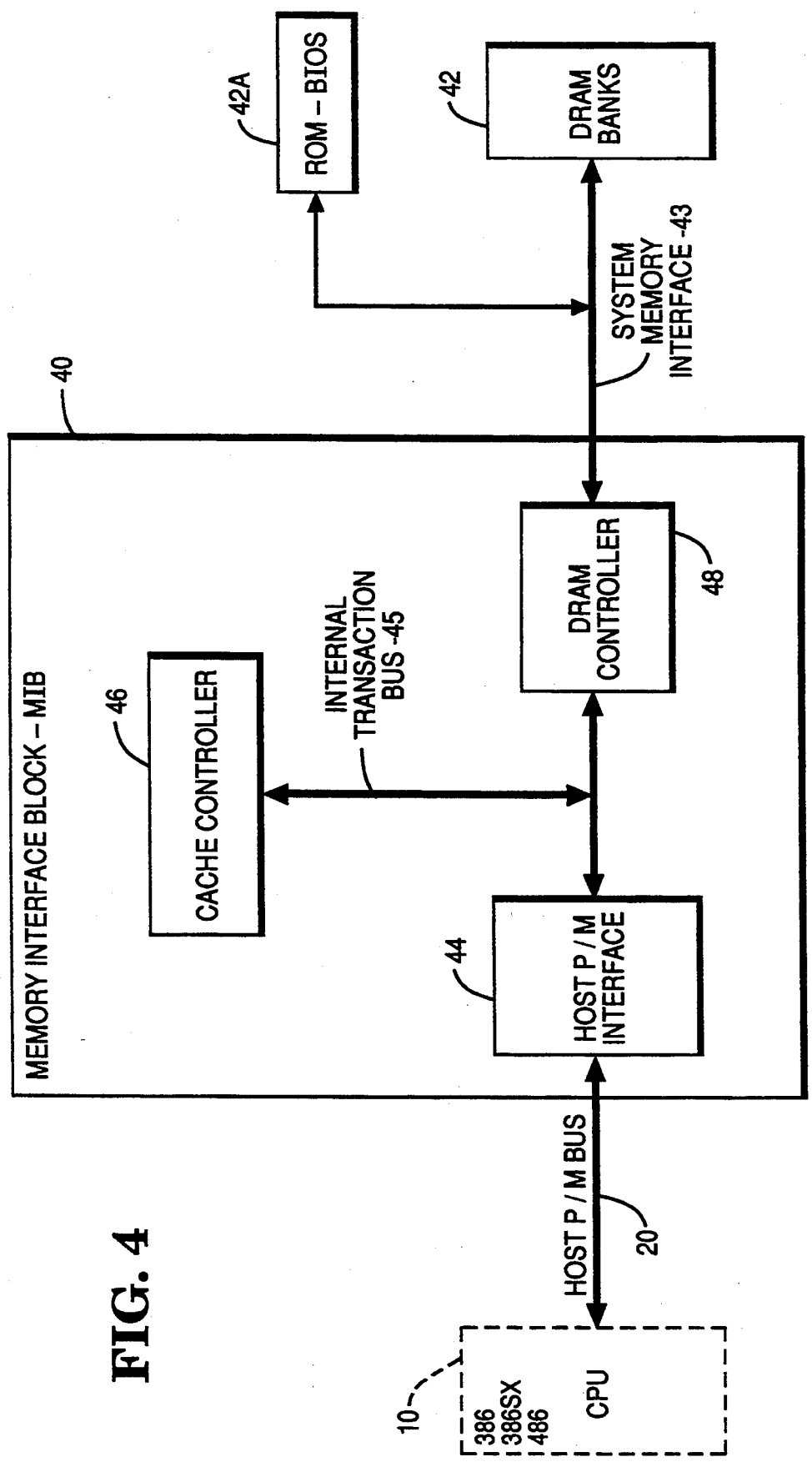
FIG. 4 is a block diagram of a memory interface block MIB.

Referring to FIGS. 1 and 4 functional block MIB 40 forms an interface between host P/M bus 20 and a DRAM memory 42 which may have various sizes, with a presently usual size of 16 MB up to 64 MB. Furthermore, MIB 40 controls access to the usual BIOS ROM memory 42a.

Figure 5:
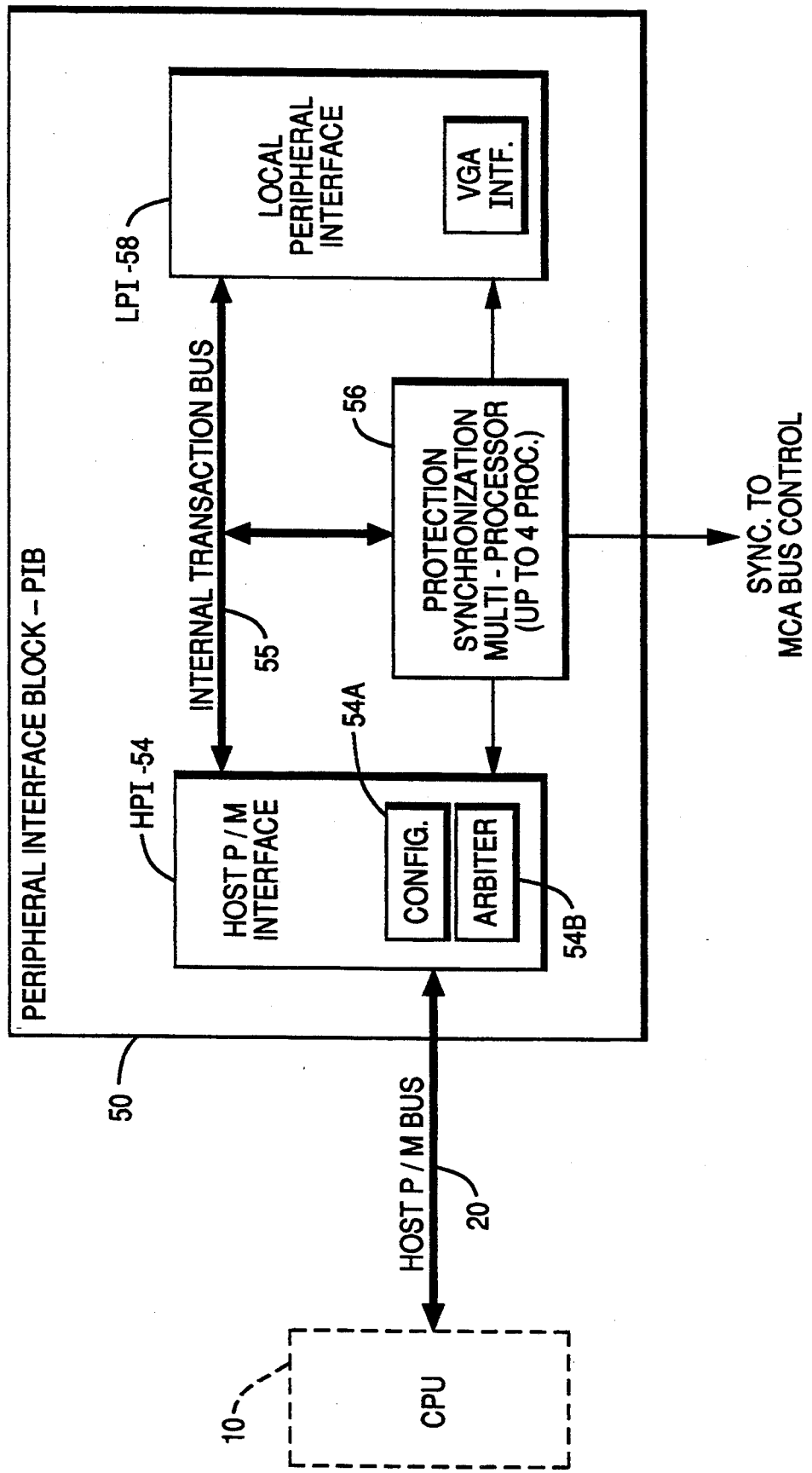
FIGS. 5A and 5B are a block diagram of the local peripheral and VGA interface PIB block.

Functional block PIB 50, FIGS. 1 and 5A and 5B, forms an interface between the host P/M bus 20 and various conventional system and peripheral units through respective control blocks. Thus, there is provided a VGA control 52a, a peripheral controller 52b, a flexible disk control 52c, a keyboard/mouse control 52d, and a RTC/CMOS RAM unit 52e. All these units are well known in the art, therefore they will not be explained in detail.

Each of the functional blocks BIB 30, MIB 40, and PIB 50 has been specifically designed as a single microchip containing all the elements such as registers and logic circuitry necessary to establish and perform communication between the host P/M bus 20 and the individual units connected to each functional block 30, 40, and 50.

As indicated in FIG. 1 it should be noted that a number m of BIBs 30 and a number n of MIBs 40 may be provided all connected to the host P/M bus 20. Thus, a large variety of configurations with different CPUs and quite different memory capacities may be implemented. Each chip may be configured quite differently to match various system configurations.

Each functional block 30, 40, 50 is provided with some intelligence, providing an operation which is relatively independent from the CPU operation generally governing all functions of the system, thus relieving the CPU from controlling data transfers between the functional blocks, such as between a BIB 30 and a MIB 40, and from any other procedures. As regards the MIB 40, this block will organize its refresh cycles for the DRAMs and overflow cleaning of caches included therein.

Basically, each functional block 30, 40, 50 includes an interface unit between the host P/M bus and an individual internal transaction bus. Though the timing is based on the CPU clock all operations within the functional block such as read or write operations will be independently performed in one cycle whilst, if these operations were controlled by the CPU 10, the CPU would need at least two cycles of the CPU clock. Accordingly, this type of system architecture offers a considerably improved performance in view of the reduction of wait states for the CPU 10 resulting in a higher overall operating speed.

FIGS. 3, 4, 5A and 5B illustrate in some detail the units contained in each of the functional blocks 30, 40, and 50.

Specifically, referring to FIG. 3 the bus interface block BIB 30 comprises, preferably arranged on a single microchip, a host P/M bus interface HPI 34 forming an interface between the host P/M bus 20 and an internal transaction bus 35 which provides communication connections to a synchronizing unit SYN 37 which is connected to an extended MC-bus control unit MCA 38 for access to the Micro Channel 32, which is arranged to transfer information at a frequency which may differ from the operating frequency of the CPU 10.

Further connected to the internal transaction bus 35 is a DMA controller DMA 36 for controlling direct memory access in a manner basically known.

Referring to FIG. 4, the single microchip memory interface block MIB 40 includes as basic units a host P/M interface 44 similar to the HPI 34 serving as an interface between the host P/M bus 20, and an internal transaction bus 45 which is again similar to the internal transaction bus 35 of the BIB 30.

Via the internal transaction bus 45 memory access is established to a cache controller 46 and through a DMA controller 48 to a system memory interface bus 43 to the DRAM memory 42.

Referring to FIGS. 5A and 5B, the single microchip peripheral interface block PIB 50 again includes a host P/M interface HPI 54 interfacing host P/M bus 20 with an internal transaction bus 55. The unit HPI 54 and the internal transaction bus 55 correspond to the respective elements 34, 44, and 35, 5 of the BIB 30 and the MIB 40, respectively.

Furthermore, PIB 50 includes, arranged in communication with the internal transaction bus 55, a synchronizing unit 56 for MCA bus control, and a local peripheral interface LPI 58 for establishing access to the system and peripheral units 52a to 52e mentioned above.

Now, as stated above, the work station according to the invention offers high flexibility in respect of using one of various types of CPUs and the numbers of Micro Channels and DRAM memory units to be included in the system. This is in contrast to known work stations where a predetermined CPU communicates with one microchannel and one DRAM memory block only.

A specifically extended host P/M bus is illustrated in FIGS. 2A to 2E in detail. Specifically, within the block CPU 10, the conventional input/output ports of a microprocessor such as the Intel 80386, etc. are listed as address ports A(2, ... 23), data ports D(0, ... 15), byte enable ports BEb (0, ... 3), and an address status output ADSb which indicates that a valid bus cycle definition and address are available and which is driven active in the same clock as the addresses are driven. ADSb is active low. The system clock POLK is generated by a clock oscillator 60 and supplied to the input port PCLK of the CPU 10 and the functional blocks BIB 30, MIB 40, and PIB 50. These and all other input/output ports of the CPU 10 and the signals presented there are conventional. Thus, they will not be explained in detail.

As may be gathered from FIGS. 2A to 2E, the functional blocks BIB 30, MIB 40, and PIB 50 are provided with similar input/output ports to the CPU. However, there are several additional ports and associated bus lines connecting corresponding ports of the functional blocks and the CPU with each other, such as CT(0 ... 1) which is a combination of the two lines included in the host P/M bus 20 indicating the type of processor (or functional block) which has access to the host P/M bus 20.

BREQb(0 ... 3) is a host P/M bus request signal with the assumption that four BIBs 30 may be provided, each being connected with the PIB 50 by a request line. BGNTb(0 ... 3) is a host P/M bus grant signal transmitted by the PIB 50 to one of the BIBs 30 which has requested access to the host P/M bus by BREQb(0 ... 3). SBURSTBLb is a signal generated by one of the functional blocks BIB 30 to temporarily halt the transfer in burst mode but keeping the burst condition established. CIN and COUT are the chain input/output signals used in a system configuration routine.

Figure 6B:
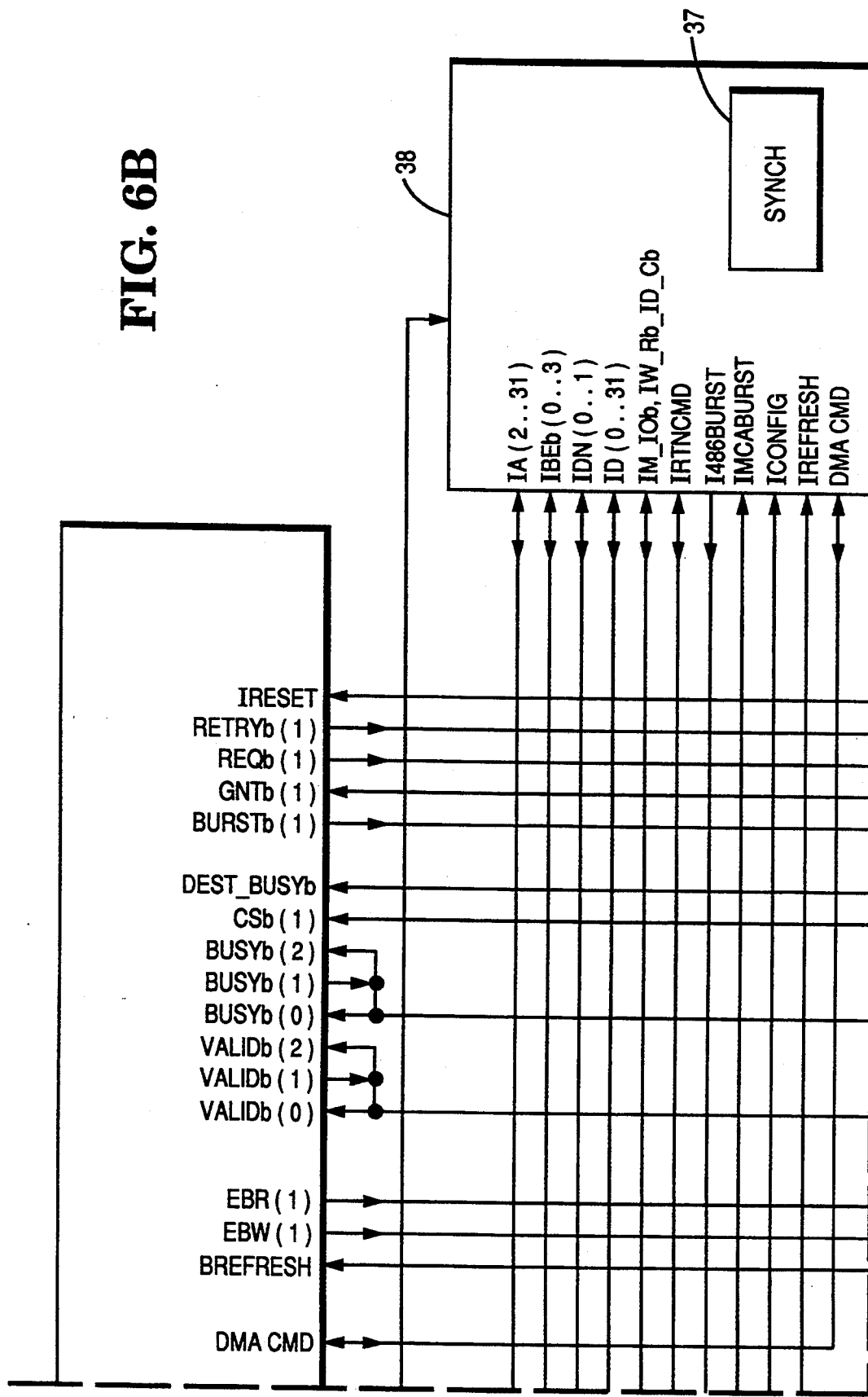

Particularly referring to FIGS. 3 and 6 the specific design of one functional block will be explained, taking a BIB 30 as an example.

As mentioned above, the functional block BIB 30 basically comprises unit HPI 34, DMA controller 36 SYNC unit 37, and MCA unit 39 which according to FIGS. 6A-6D is actually combined with EMCA unit 38. These three units communicate with each other through the internal transaction bus TRACT 35 in a similar manner to the way the CPU 10 and the functional blocks BIB 30, MIB 40, and PIB 50 communicate over the host P/M bus 20.

Accordingly, the BIB 30 is a self-contained functional block performing several functions without control of the CPU 10 or another bus master.

Comparing FIGS. 6A-6D with FIG. 2 shows close similarities of the signals and corresponding lines on host P/M bus 20 and internal transaction bus 35.

Each unit 34, 36, 38 connected to the TRACT bus 35 has a VALID signal, a REQUEST signal, a GRANT signal, and a BURST signal. Each unit has an ID number assigned a priority, with "0" the highest priority. Specifically, EMCA 38 has assigned #0, DMA 36 has assigned #1, and HPI 34 has assigned #2. Every signal marked with (n) means that this is a unique line of the TRACT bus 35 driven by one unit only.

In the following Table 1 the main signals of TRACT 35 are listed.

Table 1

IA(2:31): Internal Address Bit 2 to 31.

IBEb(0:3): Internal Byte Enables 0 to 3.

IDN(0:1): Block ID-Number (maximum number of blocks is 4).

ID(0:31): Internal Data Bits 0 to 31.

VALIDb(n): The valid signal of the unit #n is driven by unit #n at the time when the address, data, and command on the TRACT bus 35 are valid.

BUSYb(n): The busy signal of the unit #n becomes active at the time the unit #n becomes busy. It also permits data transfer to be stopped temporarily during burst mode. The burst mode remains active in that case.

REQb(n): The request signal of unit #n is driven by unit n.

GNTb(n): The grant line is driven by the internal arbiter 66.

BURSTb(n): The burst line is driven by a unit #n which currently has got a grant and wants to keep the transaction bus 35 for multiple accesses without intermission.

CSb(n): The chip select line is driven by an internal decoder 62. Each functional block has its own chip select signal.

RETRY(n): When a master unit #n tries to get access to a slave unit which is currently busy, a retry signal is generated by that master. This retry signal is used to reorder the priority on the transaction bus 35.

Broadcast Signals:

NPCLK: Clock signal for all transactions on the transaction bus 35. The system's CPU 10 runs with the same clock. The reference for all cycles is the rising edge of this clock.

IRESET: Internal reset for all units 34, 36, 37.

DEST-BUSYb: Indicates that the slave unit of the current transaction bus cycle is busy.

VALIDALLb: Combination of all VALIDb signals. This signal indicates to an addressed slave unit the presence of a valid cycle on the TRACT bus.

Figure 6C:
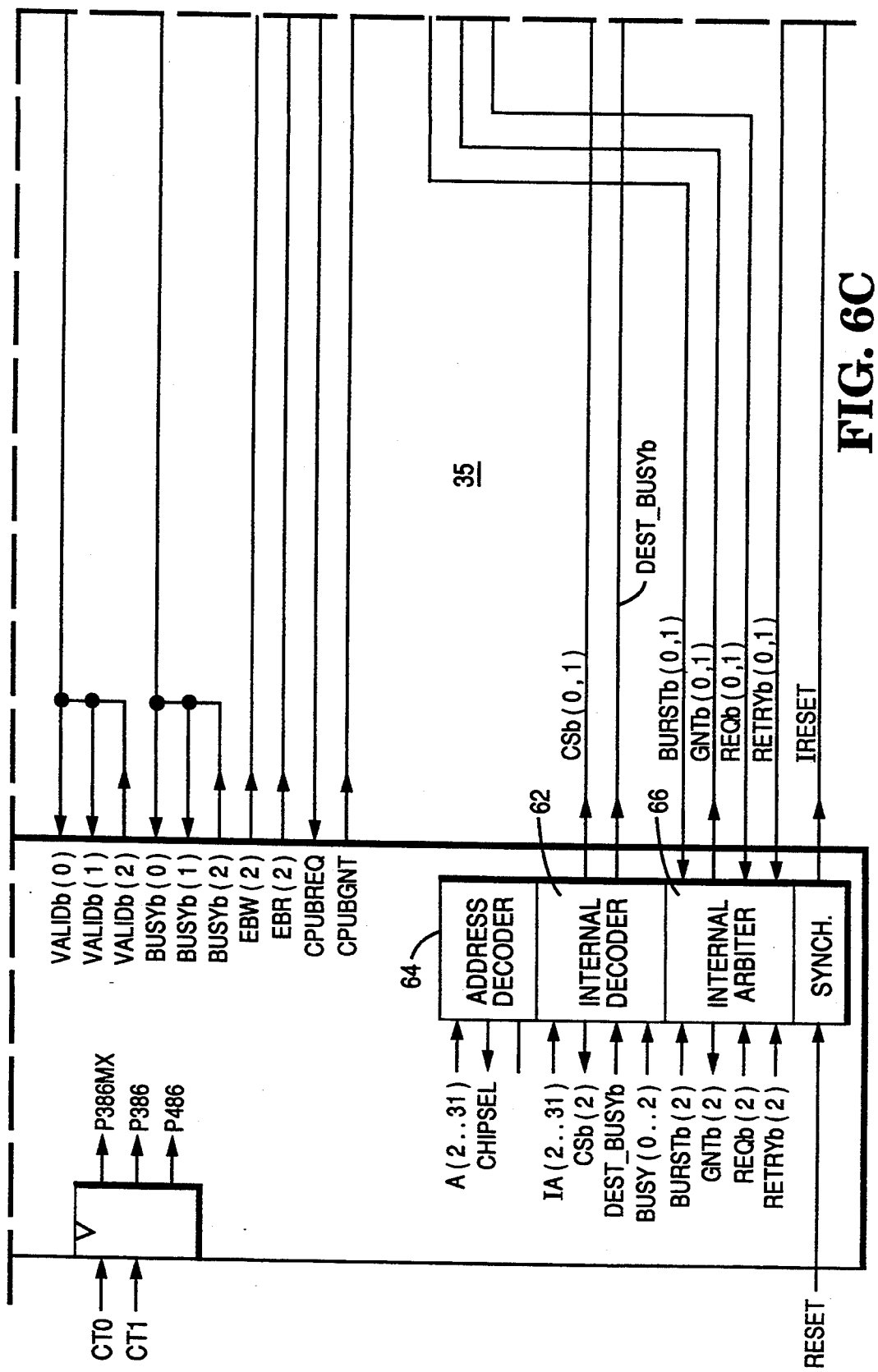
Figure 6D:
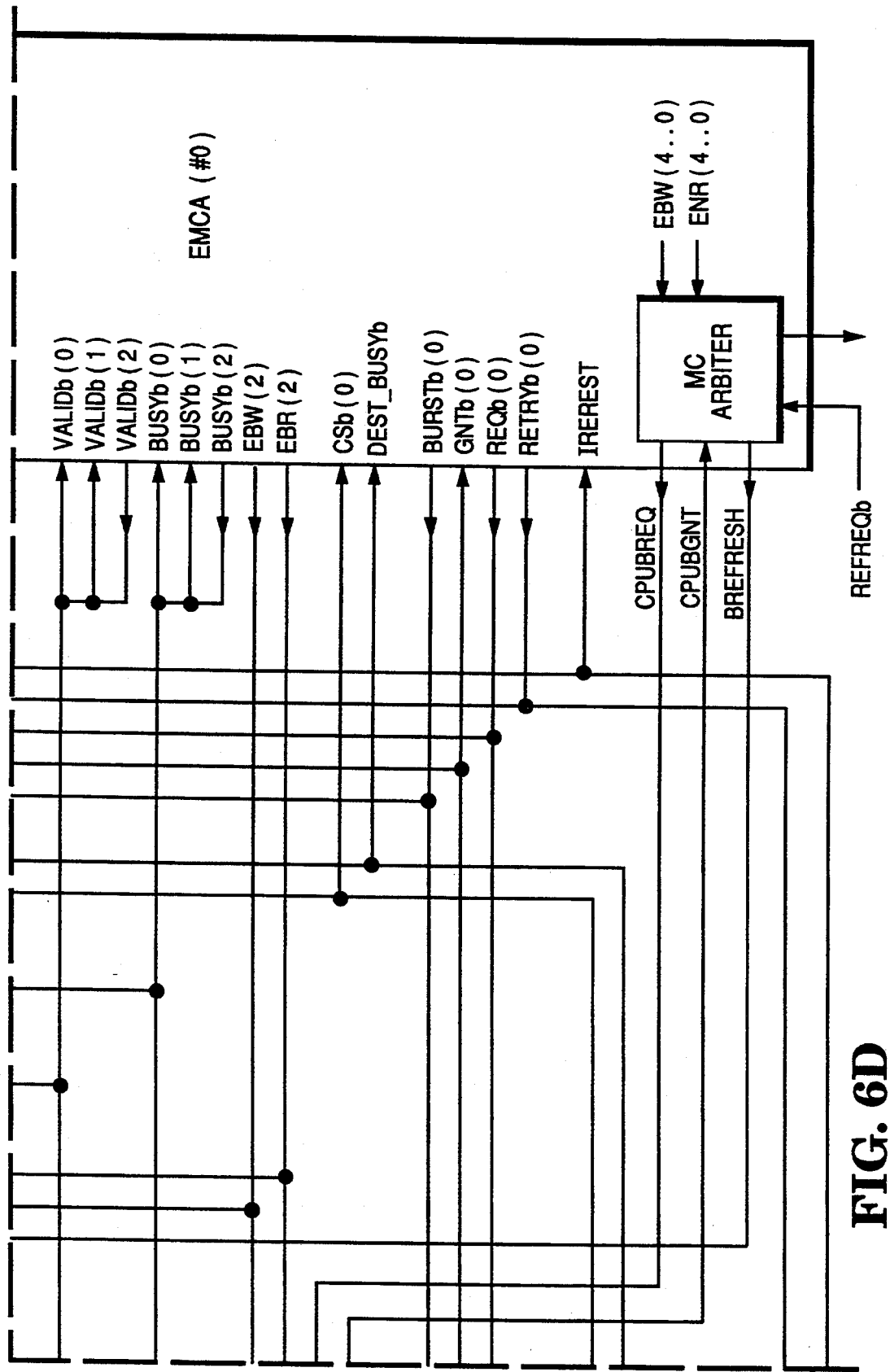

Referring particularly to FIG. 6C, HPI 34 includes an internal decoder 62 which uses the IA2 to IA31 lines to decode the access to the individual units. Every unit has its own address decode signal. This signal is generated for both memory or I/O accesses and all other commands a unit may receive. Also, the internal decoder 62 receives the busy signals of all units such as DMA 36 and EMCA 38 and generates the DEST-BUSYb signal.

Furthermore, an address decoder 64 is provided for receiving the address signals A2 to A31 from the host P/M bus 20 (see FIGS. 2 and 3) and generates the CHIPSEL signal indicating that the corresponding functional block such as BIB 30 has been selected for communication through the host P/M bus 20.

Of particular interest is an internal arbiter 66 included in the HPI 34. To get access to the TRACT 35 a unit as HPI 34, DMA 36, and EMCA 38 has to assert a request by generating a request signal REQb(0 . . . 2) to TRACT 35. Several requests may occur simultaneously. Thus, it is the task of the internal arbiter 66 to resolve these requests and to generate a grant signal GNTb(0 . . . 2) for the requesting unit with the highest priority. As mentioned before, with the preferred embodiment, EMCA 38 has the highest priority "0" whilst the HPI 34 has the lowest priority "2". The unit which detects its grant signal at the rising edge of the clock has access to the TRACT 35 for the next cycle.

Another task of the internal arbiter 66 is to handle the burst mode. If a unit has detected its grant signal and wants to carry out multiple data transfers on the TRACT 35, then this unit activates its burst line. For example, if EMCA 38 requested access to the TRACT 35 by signal REQb(0) and has been granted access by the internal arbiter transmitting the grant signal GNTb(0) to the EMCA 38, the latter will generate its BURSTb(0) signal for multiple data transfer. When the burst line is activated the current grant is kept active regardless of requests of any other unit for bus access. It should be understood that, if the burst line is not activated, then the master can be interrupted on a clock-by-clock basis by a block having higher priority. Another function of the internal arbiter is to receive the RETRYb(0 . . . 2) signals of all units and use them for reordering the priority for the next cycle.

It should be mentioned that all cycles within a functional block such as the BIB 30 are synchronous to the clock PCLK on the host P/M bus 20. All clock dependent timing is based on the rising edge of PCLK. This means that the action which refers to PCLK occurs after the next rising edge. The unit such as DMA 36 which initiates a cycle on the TRACT 35 is called "master" are preceded by "M". The unit responding to that cycle is called "slave". Thus, some signal generated by a "slave" are preceded by "S". For example, with the DMA 36 requesting data transfer to the DRAMs 42 through host P/M bus 20 and MIB 40, the DMA 36 initiates a corresponding cycle on the TRACT 35 for internal communication with HPI 34. A "b" at the end of a signal name means that this signal is active low.

In FIGS. 6A-6D some of the lines of the internal transaction bus, i.e. TRACT 35 have assignments starting with "I", such as IA(2 . . . 31) or ID(0 . . . 31) in order to distinguish them from similar lines of the host P/M bus 20 such as A(2:31) or D(0 . . . 31) for addresses and data, respectively.

Prior to explaining the operation within a functional block it appears useful to describe a feature of the work station relating to the burst mode operation between functional blocks through the host P/M bus 20. Thus, specifically, the situation at the interface between the BIB 30 to the host P/M bus 20 will be explained for a burst write operation and a burst read operation with reference to FIGS. 7 and 8, respectively.

Figure 2A:
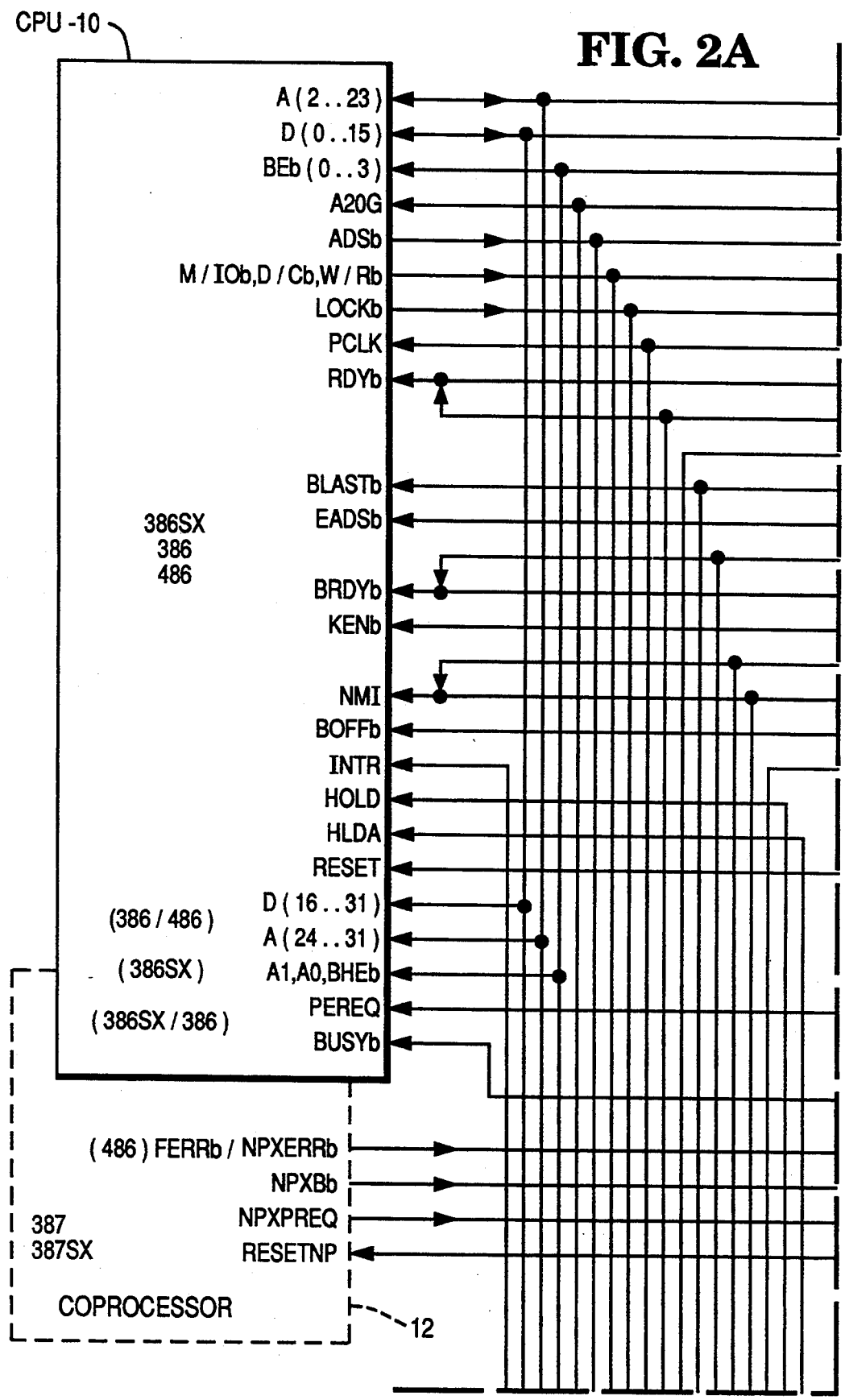
Figure 2C:
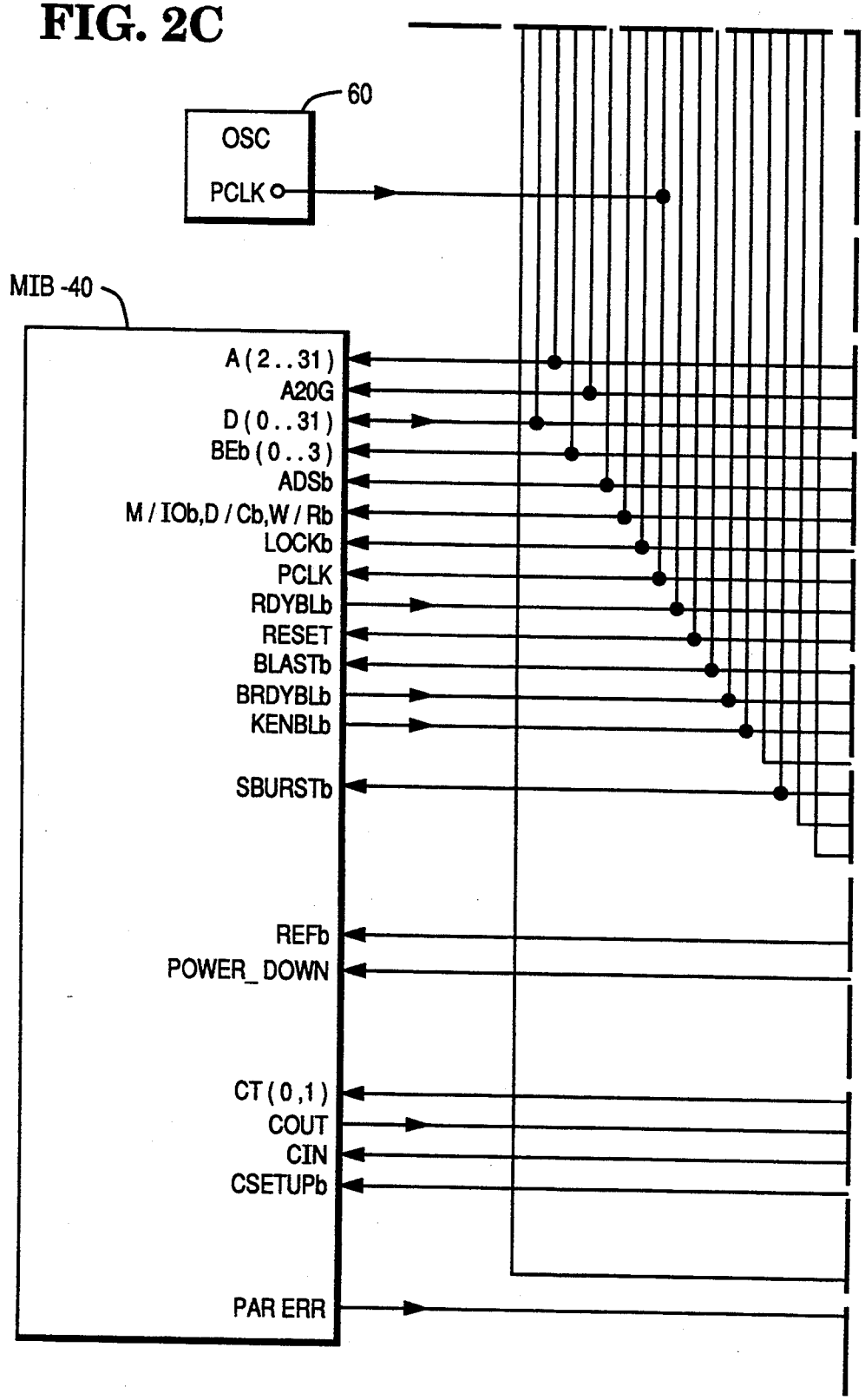
Figure 2D:
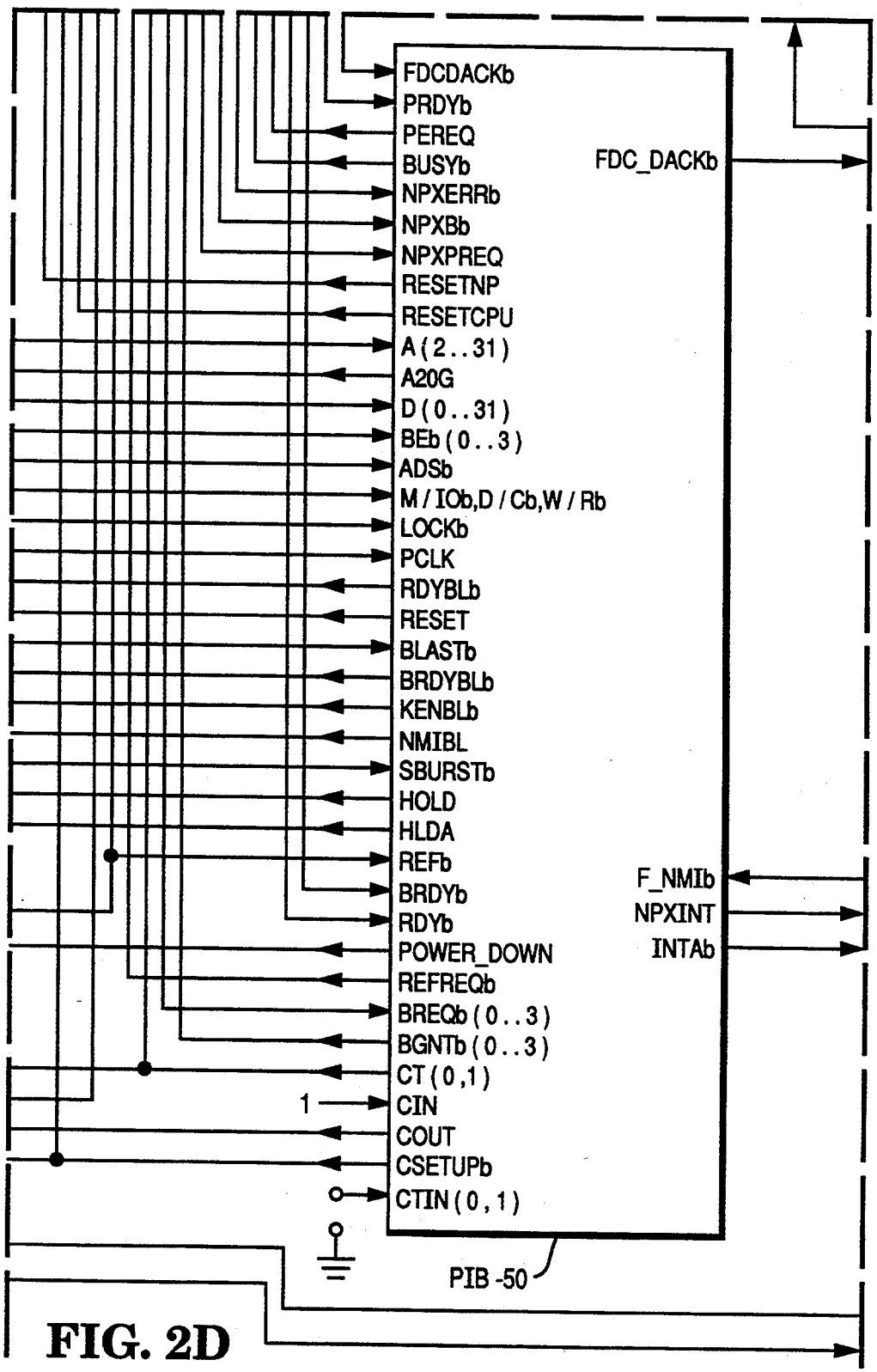

In FIG. 7, line (a) represents the CPU clock PCLK (viz. FIGS. 1 and 2C). Upon having received access to the host P/M bus as explained before, BIB 30 provides the active low signal (line (b)) LOCKb locking host P/M bus 20 for the next bus cycle, followed by the SBURSTb signal shown in line (c) indicating that a BURST write is initiated which means writing of data for a number of consecutive addresses without interruption. Signal ADSb according to line (d) goes active low indicating that the BIB 30 has put a first address A0 onto the address bus portion of the host P/M bus 20 as indicated in line (k) with HPMA.

Since with the next cycle the BIB 30 presents data D0 on the data lines of the host P/M bus 20 as indicated in line (i) with HPMD a BRDYb signal is generated by the MIB 40 indicating that the data D0 on the bus has been accepted in response to a write by the MIB 40.

With the SBURSTb in line (c) still active low a BURSTb signal according to line (h) is generated on the internal transaction bus 45 (FIG. 4) of the MIB 40 ensuring continuous data transfer through the MIB to the DRAMs 42.

In view of the SBURSTb signal remaining active low the BIB 30 presents the next address A1 and the data D1 contained therein on the host P/M bus 20 as may be seen from lines (i) and (k) in the next cycle. In the meantime A0 and D0 have been accepted by the internal transaction bus 45 of MIB 40 as indicated in the last line (1) by "0" for transfer through the MIB 40 to the DRAMs 42.

Normally, next address/data A1 and D1 present on the host P/M bus 20 would be immediately received by the MIB 40 specifically transferred to the internal transaction bus 45 thereof. However, in order to illustrate one of the important features of the present invention it is assumed that data transfer is momentarily interrupted since a procedural step of higher priority is to be performed as a refreshing cycle for the DRAMs or an overflow clearing in the caches of the MIB 40. Such a situation is indicated by the BUSYb signal going active low as indicated in line (g) issued by the MIB 40 on the internal transaction bus 45.

Since neither the BIB 30 nor the host P/M bus 20 is involved host P/M bus 20 is maintained locked and the SBURSTb signal stays active low. Therefore, BIB 30 presents the next address/data A2/D2 to the host P/M bus 20 (see lines (i) and (k)) recognized as valid by the VALIDb signal going active low. Furthermore, the host P/M bus interface 44 of the MIB 40 accepts A1/D1 from the host P/M bus 20.

Since with the BUSYb signal going active low the BRDYb signal becomes inactive the data transfer procedure is halted until the change of the BUSYb signal to its inactive state. As may be seen from lines (i), (k), and (1) there is a corresponding extension of the data transfer period. With the resuming data transfer the BIB 30 presents the next address/data A3/D3 to the host P/M bus 20 and the MIB 40 holds A2/D2 received from the host P/M bus 20 on its internal transaction bus 45 for transfer to the DRAMs 42.

As illustrated in the right-hand part of FIG. 7 at the end of an SBURST write cycle the LOCKb signal and the SBURSTb signal become inactive followed by the BRDYb. Since the BURSTb signal on the internal transaction bus 45 becomes inactive as well only A3/D3 is accepted and transferred on the internal transaction bus 45 as indicated by "3" in the last line (l).

From the foregoing description it may be appreciated that a BURST write cycle from the BIB 30 to the MIB 40 will be maintained despite any discontinuities. Thus, there is no need to restart the data transfer by requesting access to the host P/M bus 20 and waiting for an access grant. Consequently, the operating speed will be increased and the overall performance will be improved.

FIG. 8 illustrates a similar situation as in FIG. 7, however, for performing an SBURST read cycle, i.e. the reading of a number of consecutive addresses from the DRAMs 42 through the MIB 40 by the BIB 30. Since the operation is quite similar to that of the SBURST write cycle only the important differences will be highlighted. The various lines of FIG. 8 are marked with the same letters as in FIG. 7 with only two additional lines (f1) and (g1) with the signals M-VALIDb and M-BUSYb being the VALIDb and the BUSYb signals, respectively, on the internal transaction bus 45 generated by the momentary internal master unit within the MIB 40. Similarly, the signals S-BUSYb and S-VALIDb (lines (g) and (f1)) are the BUSYb and VALIDb signals on the internal transaction bus 45 generated by the momentary internal slave unit.

Referring now to FIGS. 3, 6, and particularly 9, and Table 1, the operation of the work station according to the preferred embodiment, specifically the operation of a functional block, such as the functional block BIB 30 will be explained for a single write cycle within the BIB 30.

Basically, it is assumed that the DMA 36 wants to write data to the DRAMs 42. This is accomplished through host P/M bus 20 and MIB 40. However, in order to get access to the host P/M bus 20 the address and data are transmitted to HPI 34 which is the interface to the host P/M bus 20 (see FIG. 3).

Write cycles consist of one transfer on the TRACT 35 only. A valid address, data, and command are issued on the TRACT 35 at the same time.

In FIG. 9 line (a) represents the CPU clock PCLK governing the timing of all cycles to be performed. As a first action according to line (b) DMA 36 generates the M-REQb signal going active low which signal is transmitted to the internal arbiter 66 (FIG. 6C) which, after arbitration, returns the M-GNTb signal to DMA 36 according to line (c).

As may be seen from line (d) the following information is presented simultaneously on the lines of TRACT 35: an address IA on address lines IA2 to IA31; data ID(0...31) on lines ID0 to ID31; the unit identification number IDN on two lines IDN(0:1), (eg. for the present example "01" for the DMA 36); and a command IC, specifically on lines IC0, IC1, and IC2, indicating a memory or I/O data write access.

Comparing lines (d) and (g) of FIG. 9 indicates that DMA 36 generates a M-VALIDb signal for the time the information according to line (d) is presented on TRACT 35. Every unit has a valid line. This line is activated when the master unit detects a GRANT and puts valid address, data, and command on the TRACT 35. As long as address, data, and command are valid the VALID signal is active.

A VALIDb signal can be activated even if the receiving unit is currently busy. In this case the TRACT 35 and the valid signal have to remain activated until the receiving unit resets its BUSY line. Then the master can deactivate VALID and release the TRACT 35 on the next rising edge. The signal M-BURSTb according to line (e) being inactive high indicates the situation that no burst mode operation is intended. Line (f) illustrates the S-BUSYb signal going active low generated by the HPI 34 as a slave indicating the taking-over of the information according to line (d) for presenting it to the host P/M bus 20 independent from the further operation within the BIB 30. Every unit has its own busy line. The busy line is used to tell other units that a unit cannot accept a new command.

Busy is activated only if a unit has received a command which requires more than one clock cycle to be finished. In this case busy is activated immediately on the rising clock edge after a unit received a valid command.

As long as a unit's busy is deactivated the unit is able to accept a new command from the TRACT 35 on the next rising edge of the clock. Busy is deactivated one clock before completion of the command.

As regards the situation illustrated in the right-hand part of FIG. 9 it differs from that illustrated in the left-hand part in that there is a delay due to the fact that the addressed slave unit, i.e. HPI 34 is busy in the current TRACT bus cycle. Accordingly, the signals illustrated in the lines (b), (c), (d), and (g) are extended until the DEST-BUSYb signal, line (h) generated from the internal decoder 62 of the HPI 34 and indicating the busy signal goes inactive high again.

With the M-RETRYb signal according to line (i) DMA 36 may influence the internal arbiter 66 to rearrange priority.

Referring now to FIGS. 3, 6, and particularly 10, and Table 1 the operation of the functional block BIB will be explained for a single read cycle within the BIB.

As an example, it will be assumed that the DMA 36 wants to read data from the DRAMs 42. This accomplished through host P/M bus 20 and MIB 40. As explained in connection with the write cycle, interfacing unit HPI 34 is used for communication between the DMA 36 and the host P/M bus 20 (see FIG. 3). Again, DMA 36 is the master and HPI 34 is the slave.

Figure 10:
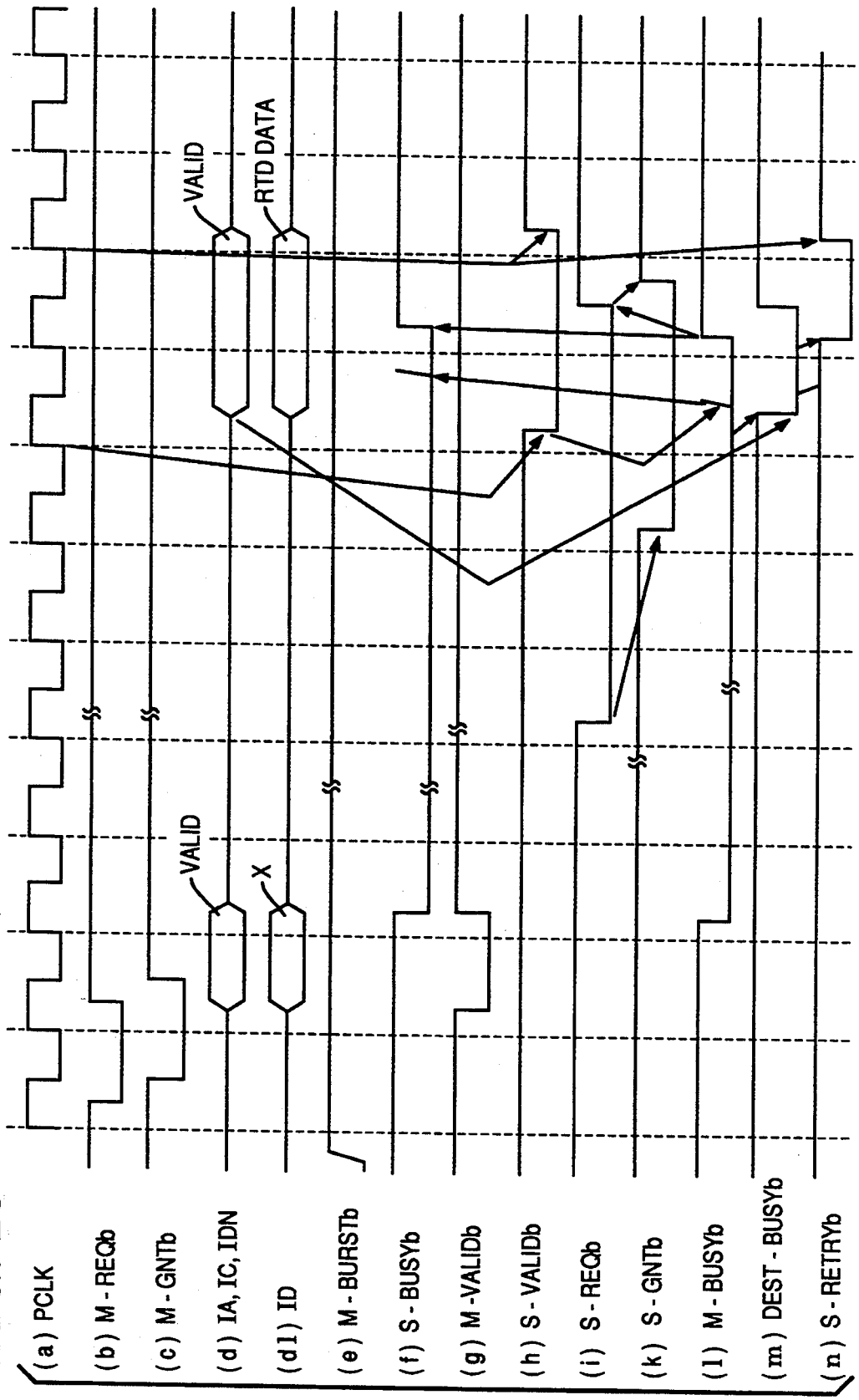
FIG. 10 is a timing diagram used for an explanation of the operation of the work station according to the invention for a single read cycle.

Read cycles consist of two parts shown in FIG. 10 in the left-hand portion and the right-hand portion, respectively.

Again, as with the write cycle, the DMA 36 as a master asserts a read request cycle on the TRACT 35 driving address and command with the data lines invalid at that time. This is illustrated in FIG. 10, lines (a), (b), (c), (d), (dl), (g). When M-VALIDb signal goes inactive high, HPI 34 acting as a slave, causes S-BUSYb (line (f)) to go active low, while DMA 36 has its M-

BUSYb signal (line (1)) go active low as well. Both signals stay active low until completion of the read cycle.

In a second part of the read cycle the slave, which in the example is HPI 34, responds after some time with a read return cycle in which the HPI 34 drives the full addresses, command signal, the master ID, and valid data, as illustrated in the right-hand portion of FIG. 10. This is confirmed by the S-VALIDb signal (line (h)) going active low. The low right-hand portion of FIG. 10 illustrates how the slave HPI 34 seeks access to the TRACT bus 35 for initiating the read return cycle. Again, this involves request and grant signal S-REQb (line (i)) and S-GNTb (line (k)). Again, the signal DEST-BUSYb (line (m)) indicates that the slave unit, i.e. the HPI 34, is busy, whilst the S-RETRY signal (line (n)) offers the opportunity to rearrange the priority in the internal arbiter 66.

It should be noted that each functional block according to the invention is designed as regards the communication between its DMA operational units as DMA 36 and HPI 34 like the main operating system with the communication between the individual functional blocks as BIBs 30 and MIBs 40.

Figure 11:
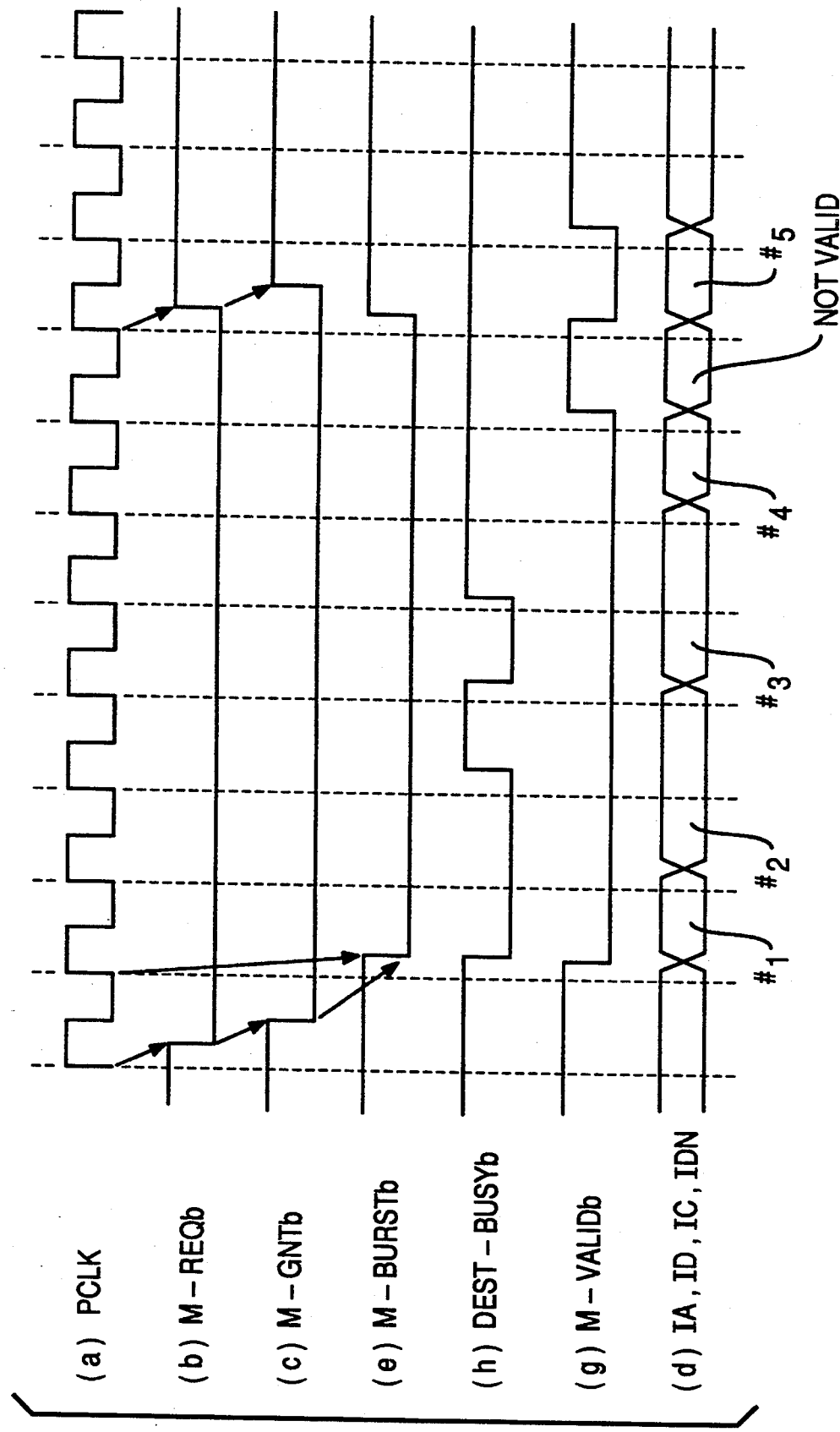
FIG. 11 is a timing diagram used for an explanation of the operation of the work station according to the invention when operating in burst write mode.

As mentioned before an important feature of the invention is the provision of a burst mode within a functional block such as BIB 30 or MIB 40. This feature will be illustrated in more detail with reference to FIGS. 11 and 12 where FIG. 11 is a timing diagram for a burst write cycle and FIG. 12 the timing diagram for a burst read cycle. The signals used are the same as used in a single write or read cycle.

It should be noted that a burst write cycle and a burst read cycle on the internal transaction bus TRACT 35 is performed quite similar to the burst mode read/write cycles on the host P/M bus 20. Thus, the following explanation of the internal burst mode operation is based on the description given before with reference to FIGS. 7 and 8 and is restricted to additional information given for the specific situation.

As compared with FIG. 9, an important difference is in the M-BURSTb signal (line (e), FIGS. 9 and 11). This signal goes active low for a burst write cycle and stays active low until the end of data transfer. As shown in the last line (d) of FIG. 11 the master DMA 36 consecutively offers addresses, data, commands, and the unit ID number on the respective lines of the TRACT bus 35 for addresses #1, #2, #3, and #4 with the M-VALIDb signal (line (g)) low. It should be noted that the DEST-BUSYb signal and the RETRYb signal may be disregarded while M-BURSTb is active low.

It should further be noted that in the burst mode the busy signal is used also to halt the data transfer temporarily. The master uses its busy signal in a burst mode read cycle. The slave, in the present example the HPI 34, uses its busy signal in a burst mode write cycle. So both master and slave have the ability to temporarily halt the burst mode but keep up the burst connection in a similar manner to the extension of a single write cycle illustrated in the right-hand portion of FIG. 9.

Specifically, this may be recognized in the last line (d) where item #1 is "read in one cycle" whilst items #2 and #3 are extended to two cycles. Thus, any temporary discontinuities in data transfer do not interrupt the current burst write cycle.

Figure 12:
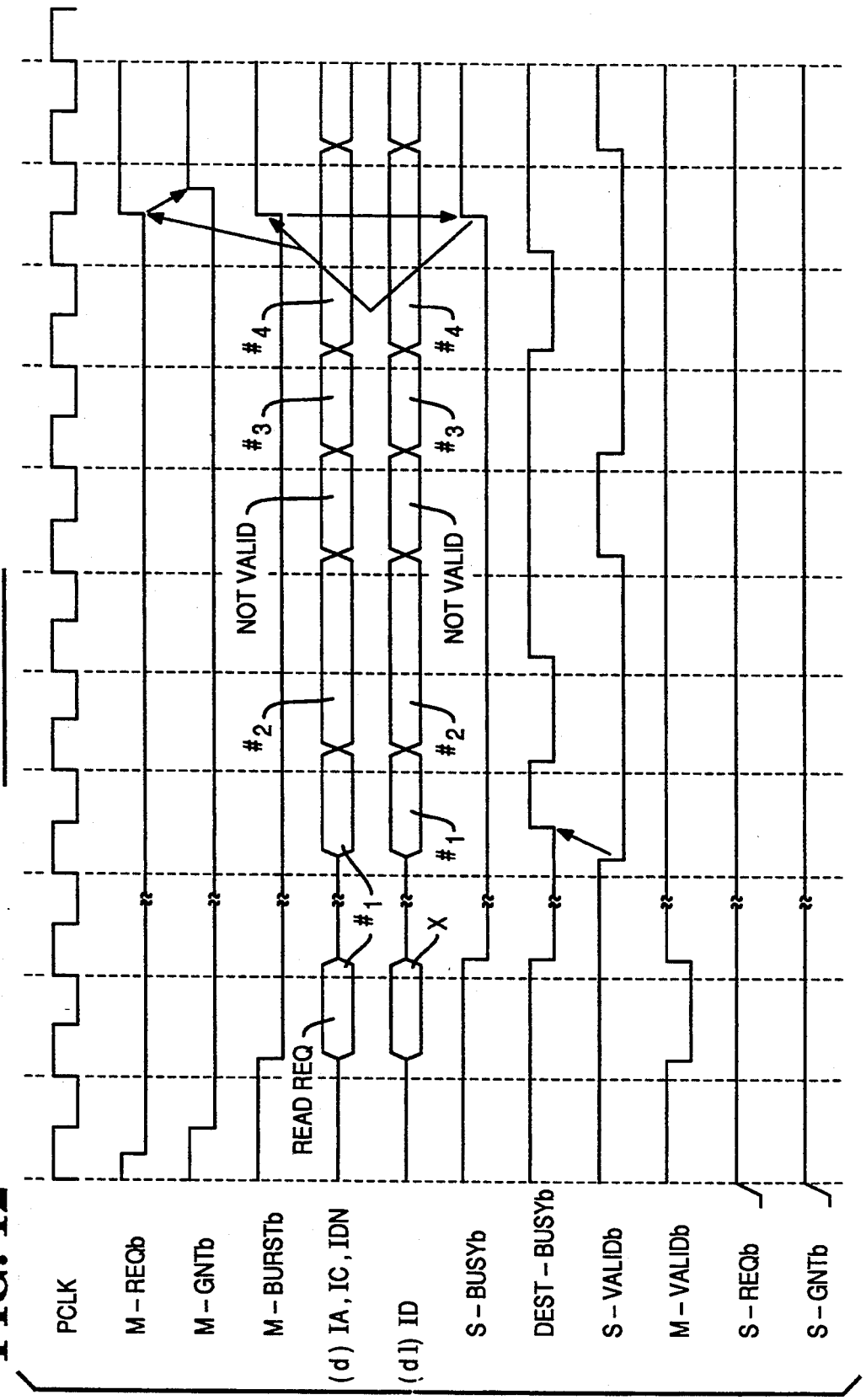
FIG. 12 is a timing diagram used for an explanation of the operation of the work station according to the invention when operating in burst read mode.

FIG. 12 illustrates a burst read cycle within the BIB 30 which is very similar to the single read cycle with the exception that the M-BURSTb signal goes low for the time necessary to transfer the intended number of data items. Again, a burst read cycle consists of two parts, the second part giving a read return not only for one address but for a number of consecutive addresses as shown in the associated lines (d) and (dl).

Whilst in the foregoing the operation of the functional block BIB 30 was explained it will be appreciated that each of the functional blocks as MIB 40 and PIB 50 is organized in a similar manner using a host P/M bus interface HPI 34, 44, or 54 respectively. Furthermore, each of the functional blocks has its internal transaction bus TRACT 35, 45, or 55, respectively, and the various units of each functional block may get access to this internal transaction bus according to the assigned priority through an internal arbiter such as arbiter 66. Also, there may be more than three units in one functional block and there may be provided a plurality of BIBs 30 and MIBs 40 with a corresponding extension of the internal transaction bus 35 or the host P/M bus 20 by further "ID number" lines, respectively. Using a similar organization and design for all of the functional blocks considerably reduces design time and design errors.

It should be noted that there is no need for CPU 10 to be involved in relation to the above explained operation of the functional block BIB 30. Thus, each functional block is effective as a self-contained unit, relieving the CPU 10 from controlling the start of write/read cycles, since these are performed within the BIB 30 on the TRACT 35.

Specifically, after the CPU has sent a command to a functional block, the latter performs this command without further control by the CPU. For example, such a command sent to BIB 30 may be write data from the Micro Channel bus 32 to DRAM 42. As will be appreciated, each functional block contains the logic and circuitry, such as flip-flops, to perform such processes. All this is contained in a state machine, which may be implemented by a skilled person according to the specific requirements and processes to be performed.

As a further feature, it should be noted that read and write operations are performed on a master/slave basis in one cycle each with a specific improved performance for read cycles: after a one cycle read request by a master the slave independently returns the requested data in one cycle as soon as it is ready.

As a further feature, it should be noted that in connection with the request/grant procedure of the BIB 30 the bus master function is transferred from the CPU 10 to the BIB 30 which is indicated by a dynamic change of the CTIN(0 . . . 1) signal (FIG. 2) to "11" presented to the MIBs 40 and the BIBs 30 as signal CT(0 . . . 1).

Thus, it will be appreciated that due to the novel architecture of the work station according to the invention the overall performance is considerably improved by enhancing the operating speed and reducing wait states. Furthermore, standardizing the required functional blocks for use in quite different configurations including various types of microprocessors and multiple provision of Micro Channel buses and memory blocks offers considerable cost reductions in production, assembly, and service.

This is particularly true for the work station according to the invention where each functional block is implemented by a single chip, each chip preferably being formed in HCMOS technique. Each chip contains all the sub-units required, such as registers and logic circuitry. Though the chips are standardized they may be used in a variety of system configurations since they include ample register space for configuration data such as type of CPU, operating frequency, DRAM memory space, etc.

As an example, each chip may be implemented in an ASIC package using 208 pins which may be easily placed on the system board of the work station.

The detail design of the present invention is captured in CDL, a high level hardware description language. CDL is a software tool which unambiguously defines the hardware for a digital logic system. The attached CDL listing completely defines a preferred embodiment of the present invention. The listing may be compiled to generate a "C" source code which may then be compiled by a C compiler to generate a standardized C Object File Format (COFF). The COFF is then input to a logic synthesis program to provide a detailed logic schematic. A logic synthesis program which may be used for this purpose is SYNOPSYS, available from Synopsys Inc., Mountain View, Calif.

It will be clear to those skilled in the art that the present invention is not limited to the specific embodiment disclosed and illustrated herein. Nor is the term "work station" limited to a particular type of computer, but it is to be interpreted in its broadest sense to include any data processing system.

Numerous modifications, variations, and full and partial equivalents can be undertaken without departing from the invention as limited only by the spirit and scope of the appended claims.

Table 2

```
/* HOST PM INTERFACE DIRECTION FROM TRANSACTION TO HOST */

.BIDI D[31..0]:
.OUTPUT A[31..2],BEb[3..0],ADSb,M_IOb,D_Cb,W_Rb,HBREQb,LOCKb,HSBURSTBLb
        HHOFFBLb,HEADSBLb,HAHOLDBL,HTCb:
.INPUT CT[1..0],CHIPSEL,HBGNTb,BRDYb,RDYb,BLASTb:

/* SIGNALS FROM /TO XACT */

.BIDI ID[31..0],IA[31..2],IBEb[3..0],IDM[1..0],IM_IOb,ID_Cb,IM_Rb
      IRTNCMD,IMCABURST,ICONFIG,IDMACMD,I486BURST,IREFRESH:
.OUTPUT CPUBGNT,ORETRYb,OVALIDb,OBUSYb,OREQb,OEBW,OEBR,GNTOOK,OBURSTb:
.INPUT IRESET,VALIDALLb,INCSb,INCNTb,DEST_BUSYb,CPUBREQ,BURSTALLb,INREQOb
       ITCb:

.PULLUP A=FFFFFFFCh,ADSb=1,LOCKb=1,IRTNCMD=0:
/*.PULLUP BEb=Fh:*/
/*.PULLUP D=FFFFFFFFh:*/
/*.PULLUP ID=FFFFFFFFh:*/                          /*DON'T FORGET TO REMOVE*/

.SIGNAL ST[5..0]:

.IFLEVEL TOP
.CLOCK NPCLX:
.EDGE RISING NPCLX:
.VECTOR 0:
.ELSE
.INPUT NPCLX:
.ASSIGN NPCLX:
.EDGE RISING NPCLX:
.ENDIF

/* DEFINES
.DEFINE MCAID = 00000001b:
.DEFINE VERSION = 00010000b:
*/

/* CLK PRESCALER */
/* IF ITS A 386 OR 386SX THEN USE HALFCLX */
/* CHANGE THE DEF OF PHI1 AND PHI2 SO THAT PHI1 IS A HIGH PULSE */
/* THATS THAN THE SAME AS ON THE 486 */
/* CT[1]  CT[0]  PROC
    0      0     386 SX
    0      1     386
    1      0     486
    1      1     MICROCHANNEL MASTER
*/

RESET1 := IRESET:
SAMP = RESET1 & !IRESET:

P386SX := !CT[1] & !CT[0] & SAMP
        # P386SX & !IRESET:
P386   := !CT[1] & CT[0] & SAMP
        # P386 & !IRESET:
P486   := CT[1] & !CT[0] & SAMP
        # P486 & !IRESET:
/*
HALFCLX:=!HALFCLX & !IRESET:
CLKSEL = P386 # P386SX:
CLKMUX(CLKSEL,PCLX,HALFCLX,NPCLX):
.ASSIGN NPCLX:
*/

/* ADRESS AND STATUS PATH */
```

```
ECOUNTER(CNTEN,ILAINV,IA[31..2],IZA[31..2]);
EREGISTER(EILA,IBEb[3..0],IZBE[3..0]);
EREGISTER(ILA,IM_IOb,IZM_IOb);
EREGISTER(ILA,ID_Cb,IZD_Cb);
EREGISTER(ILA,IW_Rb,IZW_Rb);

BUFFER(ICAb,IZA[31..2],A[31..2]);
BUFFER(ICAb,IZBE[3..0],BEb[3..0]);
BUFFER(ICAb,IZM_IOb,M_IOb);
BUFFER(ICAb,IZD_Cb,D_Cb);
BUFFER(ICAb,IZW_Rb,W_Rb);

/* ID NUMBER AND CHDRTN REGS */

EREGISTER(ILA,IDN[1..0],IIDN[1..0]);
EREGISTER(ILA,IMCABURST,IIMCABURST);
EREGISTER(ILA,ICONFIG,IICONFIG);
EREGISTER(ILA,IDMACMD,IIDMACMD);
EREGISTER(ILA,I486BURST,II486BURST);
EREGISTER(ILA,IREFRESH,IIREFRESH);

BUFFER(IVL2Ob,IZA[31..2],IA[31..2]);
BUFFER(IVL2Ob,IZBE[3..0],IBEb[3..0]);
BUFFER(IVL2Ob,IZM_IOb,IM_IOb);
BUFFER(IVL2Ob,IZD_Cb,ID_Cb);
BUFFER(IVL2Ob,IZW_Rb,IW_Rb);
BUFFER(IVL2Ob,IIDN[1..0],IDN[1..0]);
BUFFER(IVL2Ob,IIMCABURST,IMCABURST);
BUFFER(IVL2Ob,IICONFIG,ICONFIG);
BUFFER(IVL2Ob,IIDMACMD,IDMACMD);
BUFFER(IVL2Ob,II486BURST,I486BURST);
BUFFER(IVL2Ob,IIREFRESH,IREFRESH);

/* DATAPATH */

EREGISTER(ILDI,D[31..0],XD[31..0]);
EREGISTER(ILDO,ID[31..0],IXD[31..0]);

BUFFER(ICTOIb,XD[31..0],ID[31..0]);
BUFFER(IITOCb,IXD[31..0],D[31..0]);

/* MISC LOGIC */

BUFFER(ICADSb,0,ADSb);
BUFFER(IGLCKb,0,LOCKb);
BUFFER(IVL2Ob,1,IRTNCMD);

CPUBGNT = !HBGNTb & (P386 # P386SX) # CPUBREQ & P486;
HBREQb = (!CPUBREQ & (P386 # P386SX) # !IBRQ & P486) & X_BREQb;

ILA = (ST==0);

EILA = ILA # ILDO;

ORETRYb := DEST_BUSYb # IVL2Ob;

OINCNTb := INCNTb;
IVL2Ob = PREVALb # OINCNTb;

ICTOIb = OVALIDb;

ODEST_BUSYb := DEST_BUSYb;

OVALIDb = IVL2Ob & ((((ST==35)#(ST==39)#(ST==43)) & BURSTALLb)
                    # !((ST==35)#(ST==39)#(ST==43)))     /* MERGE POINT */
                & (!(((ST==35)#(ST==39)#(ST==43)) # ODEST_BUSYb);

OREQb =   IREQ2Ob
          &
          (!(((ST==24)#(ST==28)#(ST==32)) # (RDYb & BRDYb));   /* MERGE POINT */

OBUSYb =                                                /* MERGE POINT */
          ((((ST==10)#(ST==11)#(ST==15)#(ST==16)#(ST==20)#(ST==21) ) & !BRDYb)
          # !((ST==10)#(ST==11)#(ST==15)#(ST==16)#(ST==20)#(ST==21) ))
          &
             ((((ST==35)#(ST==39)#(ST==43)) & BURSTALLb)
             # !((ST==35)#(ST==39)#(ST==43)))
          &
             BST2Ob;

ILDO =    XDO
          &
             ((((ST==10)#(ST==15)#(ST==20)) & !BRDYb)
             # !((ST==10)#(ST==15)#(ST==20)));

ILDI =    XDI
          &
             ((((ST==35)#(ST==39)#(ST==43)) & DEST_BUSYb)
             # !((ST==35)#(ST==39)#(ST==43)));

IGLCKb =   LCKb
           #
```

```
                (((ST--35)#(ST--39)#(ST--43)) & BURSTALLb);

HSBURSTBLb =    SBRSTb
           #
                (((ST--35)#(ST--39)#(ST--43)) & BURSTALLb)
           #
                !((((ST--35)#(ST--39)#(ST--43)) & DEST_BUSYb)
                # !((ST--35)#(ST--39)#(ST--43)));

ADRVALb =       SBRSTb
           #
                (((ST--35)#(ST--39)#(ST--43)) & BURSTALLb);

ILAINV = !ILA;
CNTEN = (((ST--10)#(ST--11)#(ST--15)#(ST--16)#(ST--20)#(ST--21)
         #(((ST--35)#(ST--36)#(ST--39)#(ST--40)#(ST--43)#(ST--44))&DEST_BUSYb))
         & !BRDYb);

ICAb = XAb & ADRVALb;

!HEADSBLb = (((ST--1)#(ST--7) # (!HSBURSTBLb & IZW_Rb)) & P486;

IBRQ = XBRQ & (!((ST--35)#(ST--39)#(ST--43)) # !BURSTALLb);

HAHOLDBL = (XAHOLD & !((ST--43) & BURSTALLb)) # X_AHLD;
OHAHOLDBL := HAHOLDBL;
HBOFFBLb = !(HAHOLDBL & OHAHOLDBL) & X_BOFFb;

OEBW = (!OBUSTb # !LOCKb) & IZW_Rb;
OEBR = (!OBUSTb # !LOCKb) & !IZW_Rb;

SETREG = !ADSb;
RESREG = (!!RESET & RDYb & (BRDYb # BLASTb));
CRREGISTER(SETREG,RESREG,1,CYCINPR);                    /*CYCLE IN PROGRESS*/

X_HREQb = INREQOb # !CPUHREQ;
X_AH1 := !(INREQOb # HBGNTb # !CPUHREQ) & P486 & (!CYCINPR # CHIPSEL)
         # (X_AH1 & !INREQOb);
X_AHLD = X_AH1 & !INREQOb;
X_B1 := X_AHLD;
X_BOFFb = !(X_B1 & !INREQOb);

CNTOOK = (!(INREQOb # HBGNTb)) & CPUHREQ & !P486
         # (!INREQOb & X_AHLD) & P486;          /*FOR THE XACT BUS ARBITER*/
                                                /*TO MAKE SURE THAT THE HP/M AVAILABLE*/

HTCb = ITCb;            /*PASSED THRU FROM XACT TO HP/M, FOR FDC IN PIB*/

OHURSTb = 1;                                    /*DUMMY FOR HPI.CDL*/

/* STATEMACHINE THAT CONTROLS THE OUTPUT OF HPI */

/*                              I          P   */
/*                    I      I R B X    S R    */
/*                    G       I E S A    B E   */
/*                    A       T Q Y H X L R V  */
/*                    D X X X O 2 2 O B C S A  */
/*                    S A D D C O O L R K T L  */
/*                    b b I O b b b D Q b b b  */

.STATEDEF    HOIDLE    1,1,0,1,1,1,1,0,0,1,1,1,    0;
.STATEDEF    HOS1      0,0,0,0,0,1,0,0,1,0,1,1,    1;
.STATEDEF    HOS2      1,0,0,0,0,1,0,0,1,0,1,1,    2;
.STATEDEF    HOS3      1,1,0,0,1,1,0,0,1,1,1,1,    3;
.STATEDEF    HOS4      0,0,0,0,0,1,0,0,1,0,1,1,    4;
.STATEDEF    HOS5      1,0,0,0,0,1,0,0,1,0,1,1,    5;
.STATEDEF    HOS6      1,1,0,0,1,1,0,1,1,0,1,1,    6;
.STATEDEF    HOS7      0,0,0,0,0,1,0,1,1,0,1,1,    7;
.STATEDEF    HOS8      1,0,0,0,0,1,0,1,1,0,1,1,    8;
.STATEDEF    HOS9      0,1,0,0,0,1,0,0,1,0,0,1,    9;
.STATEDEF    HOS10     1,1,0,1,0,1,1,0,1,0,0,1,   10;
.STATEDEF    HOS11     1,1,0,1,0,1,1,0,1,0,0,1,   11;
.STATEDEF    HOS12     1,0,0,0,1,1,0,1,0,1,1,1,   12;
.STATEDEF    HOS13     1,1,0,0,1,1,0,0,1,1,1,1,   13;
.STATEDEF    HOS14     0,1,0,0,0,1,0,0,1,0,1,1,   14;
.STATEDEF    HOS15     1,1,0,1,0,1,1,0,1,0,0,1,   15;
.STATEDEF    HOS16     1,1,0,1,0,1,1,0,1,0,0,1,   16;
.STATEDEF    HOS17     1,0,0,0,0,1,1,0,0,0,1,1,   17;
.STATEDEF    HOS18     1,1,0,0,1,1,0,1,1,1,1,1,   18;
.STATEDEF    HOS19     0,1,0,0,0,1,0,1,1,0,0,1,   19;
.STATEDEF    HOS20     1,1,0,1,0,1,1,1,1,0,0,1,   20;
.STATEDEF    HOS21     1,1,0,1,0,1,1,1,1,0,0,1,   21;
.STATEDEF    HOS22     1,0,0,0,0,1,1,1,1,0,1,1,   22;
```

```
.STATEDEF    HOS23    0,0,0,0,1,1,0,0,1,0,1,1,  23:
.STATEDEF    HOS24    1,0,1,0,1,1,0,0,1,0,1,1,  24:
.STATEDEF    HOS25    1,1,0,0,1,0,0,0,1,1,0,    25:
.STATEDEF    HOS26    1,1,0,0,1,1,0,0,1,1,1,1,  26:
.STATEDEF    HOS27    0,0,0,0,1,1,0,0,1,0,1,1,  27:
.STATEDEF    HOS28    1,0,1,0,1,1,0,0,1,0,1,1,  28:
.STATEDEF    HOS29    1,1,0,0,1,0,0,0,1,1,0,    29:
.STATEDEF    HOS30    1,1,0,0,1,1,0,1,1,0,1,1,  30:
.STATEDEF    HOS31    0,0,0,0,1,1,0,1,1,0,1,1,  31:
.STATEDEF    HOS32    1,0,1,0,1,1,0,1,1,0,1,1,  32:
.STATEDEF    HOS33    1,1,0,0,1,0,0,0,1,1,0,    33:
.STATEDEF    HOS34    0,1,0,0,1,1,0,0,1,0,0,1,  34:
.STATEDEF    HOS35    1,1,1,0,1,1,1,0,1,0,0,1,  35:
.STATEDEF    HOS36    1,1,1,0,1,1,0,0,1,0,0,1,  36:
.STATEDEF    HOS37    1,1,0,0,1,1,0,0,1,1,1,1,  37:
.STATEDEF    HOS38    0,1,0,0,1,1,0,0,1,0,0,1,  38:
.STATEDEF    HOS39    1,1,1,0,1,1,1,0,1,0,0,1,  39:
.STATEDEF    HOS40    1,1,1,0,1,1,0,0,1,0,0,1,  40:
.STATEDEF    HOS41    1,1,0,0,1,1,0,1,1,0,1,1,  41:
.STATEDEF    HOS42    0,1,0,0,1,1,0,1,1,0,0,1,  42:
.STATEDEF    HOS43    1,1,1,0,1,1,1,1,1,0,0,1,  43:
.STATEDEF    HOS44    1,1,1,0,1,1,0,1,1,0,0,1,  44:

.STATEDEF    HOS45    1,1,0,0,1,1,0,0,1,1,1,1,  45:
.STATEDEF    HOS46    1,1,0,0,1,1,0,1,1,0,1,1,  46:
.STATEDEF    HOS47    1,1,0,0,1,1,0,0,1,1,1,1,  47:
.STATEDEF    HOS48    1,1,0,0,1,1,0,1,1,0,1,1,  48:
.STATEDEF    HOS49    1,1,0,0,1,1,0,0,1,1,1,1,  49:
.STATEDEF    HOS50    1,1,0,0,1,1,0,1,1,0,1,1,  50:
.STATEDEF    HOS51    1,1,0,0,1,1,0,0,1,1,1,1,  51:
.STATEDEF    HOS52    1,1,0,0,1,1,0,1,1,0,1,1,  52:

.STATEMACHINE ST[5..0]:
.SMEXTEND  ICADSb, XAb, XDI, XDO, IITOCb, IREQ2Ob, BSY2Ob, XAHOLD, XBRQ, LCXb, SBRSTb
           PREVALb:
.DEFAULT HOIDLE:
.RESET IRESET 1 HOIDLE:

.STATE HOIDLE:
    IF (!VALIDALLb & !INCSb & !IRTNCMD & IW_Rb & !HBGNTb & !IMCABURST & !IREFRESH) THEN HOS1
ELSE
    IF (!VALIDALLb & !INCSb & !IRTNCMD & IW_Rb & !HBGNTb & !IMCABURST & !IREFRESH) THEN HOS9
ELSE
    IF (!VALIDALLb & !INCSb & !IRTNCMD & IW_Rb & HBGNTb & !IMCABURST & !P486 & !IREFRESH) THEN HOS3
ELSE
    IF (!VALIDALLb & !INCSb & !IRTNCMD & IW_Rb & HBGNTb & !IMCABURST & P486 & !IREFRESH) THEN HOS45
ELSE
    IF (!VALIDALLb & !INCSb & !IRTNCMD & IW_Rb & HBGNTb & IMCABURST & !P486 & !IREFRESH) THEN HOS13
ELSE
    IF (!VALIDALLb & !INCSb & !IRTNCMD & IW_Rb & HBGNTb & IMCABURST & P486 & !IREFRESH) THEN HOS47
ELSE

IF (!VALIDALLb & !INCSb & !IRTNCMD & !IW_Rb & !HBGNTb & !IMCABURST & !IREFRESH) THEN HOS23
ELSE
    IF (!VALIDALLb & !INCSb & !IRTNCMD & !IW_Rb & !HBGNTb & IMCABURST & !IREFRESH) THEN HOS34
ELSE
    IF (!VALIDALLb & !INCSb & !IRTNCMD & !IW_Rb & HBGNTb & !IMCABURST & !P486 & !IREFRESH) THEN HOS26
ELSE
    IF (!VALIDALLb & !INCSb & !IRTNCMD & !IW_Rb & HBGNTb & !IMCABURST & P486 & !IREFRESH) THEN HOS49
ELSE
    IF (!VALIDALLb & !INCSb & !IRTNCMD & !IW_Rb & HBGNTb & IMCABURST & !P486 & !IREFRESH) THEN HOS37
ELSE
    IF (!VALIDALLb & !INCSb & !IRTNCMD & !IW_Rb & HBGNTb & IMCABURST & P486 & !IREFRESH) THEN HOS51

ELSE HOIDLE:

.STATE HOS1:
    GOTO HOS2:

.STATE HOS2:
    IF (RDYb & BRDYb) THEN HOS2
    ELSE HOIDLE:

.STATE HOS3:
    IF (HBGNTb) THEN HOS3
    ELSE HOS4:

.STATE HOS4:
    GOTO HOS5:

.STATE HOS5:
    IF (RDYb & BRDYb) THEN HOS5
    ELSE HOIDLE:

.STATE HOS6:
    GOTO HOS7:
```

```
.STATE HOS7:
    GOTO HOS8;

.STATE HOS8:
    IF (RDYb & BRDYb) THEN HOS8
    ELSE HOIDLE;

.STATE HOS9:
    IF (BURSTALLb) THEN HOIDLE
    ELSE IF (VALIDALLb) THEN HOS12
        ELSE HOS10;

.STATE HOS10:
    IF (VALIDALLb & !BURSTALLb) THEN HOS12
    ELSE IF (BRDYb # !BURSTALLb) THEN HOS10
        ELSE HOIDLE;

.STATE HOS11:
    IF (BRDYb) THEN HOS11
    ELSE HOIDLE;

.STATE HOS12:
    IF (BURSTALLb) THEN HOIDLE
    ELSE IF (VALIDALLb) THEN HOS12
    ELSE HOS10;

.STATE HOS13:
    IF (HBCNTb) THEN HOS13
    ELSE HOS14;

.STATE HOS14:
    IF (BURSTALLb) THEN HOIDLE
    ELSE IF (VALIDALLb) THEN HOS17
        ELSE HOS15;

.STATE HOS15:
    IF (VALIDALLb & !BURSTALLb) THEN HOS17
    ELSE IF (BRDYb # !BURSTALLb) THEN HOS15
        ELSE HOIDLE;

.STATE HOS16:
    IF (BRDYb) THEN HOS16
    ELSE HOIDLE;

.STATE HOS17:
    IF (BURSTALLb) THEN HOIDLE
    ELSE IF (VALIDALLb) THEN HOS17
        ELSE HOS15;

.STATE HOS18:
    GOTO HOS19;

.STATE HOS19:
    IF (BURSTALLb) THEN HOIDLE
    ELSE IF (VALIDALLb) THEN HOS22
        ELSE HOS20;

.STATE HOS20:
    IF (VALIDALLb & !BURSTALLb) THEN HOS22
    ELSE IF (BRDYb # !BURSTALLb) THEN HOS20
        ELSE HOIDLE;

.STATE HOS21:
    IF (BRDYb) THEN HOS21
    ELSE HOIDLE;

.STATE HOS22:
    IF (BURSTALLb) THEN HOIDLE
    ELSE IF (VALIDALLb) THEN HOS22
        ELSE HOS20;

.STATE HOS23:
    GOTO HOS24;

.STATE HOS24:
    IF (RDYb & BRDYb) THEN HOS24
    ELSE HOS25;
```

```
.STATE HOS25:
    IF (QINCNTD # !DEST_BUSYD) THEN HOS25
    ELSE HOIDLE:

.STATE HOS26:
    IF (HBCNTD) THEN HOS26
    ELSE HOS27:

.STATE HOS27:
    GOTO HOS28:

.STATE HOS28:
    IF (RDTD & BRDTD) THEN HOS28
    ELSE HOS29:

.STATE HOS29:
    IF (QINCNTD # !DEST_BUSYD) THEN HOS29
    ELSE HOIDLE:

.STATE HOS30:
    GOTO HOS31:

.STATE HOS31:
    GOTO HOS32:

.STATE HOS32:
    IF (RDTD & BRDTD) THEN HOS32
    ELSE HOS33:

.STATE HOS33:
    IF (QINCNTD # !DEST_BUSYD) THEN HOS33
    ELSE HOIDLE:

.STATE HOS34:
    GOTO HOS36:

.STATE HOS35:
    IF (!DEST_BUSYD) THEN HOS35
    ELSE IF (!BURSTALLD & BRDTD) THEN HOS36
        ELSE IF (!BURSTALLD & !BRDTD) THEN HOS35
            ELSE HOIDLE:

.STATE HOS36:
    IF (BRDTD) THEN HOS36
    ELSE IF (!BURSTALLD) THEN HOS35
        ELSE HOIDLE:

.STATE HOS37:
    IF (HBCNTD) THEN HOS37
    ELSE HOS38:

.STATE HOS38:
    GOTO HOS40:

.STATE HOS39:
    IF (!DEST_BUSYD) THEN HOS39
    ELSE IF (!BURSTALLD & BRDTD) THEN HOS40
        ELSE IF (!BURSTALLD & !BRDTD) THEN HOS39
            ELSE HOIDLE:

.STATE HOS40:
    IF (BRDTD) THEN HOS40
    ELSE IF (!BURSTALLD) THEN HOS39
        ELSE HOIDLE:

.STATE HOS41:
    GOTO HOS42:

.STATE HOS42:
    GOTO HOS44:

.STATE HOS43:
    IF (!DEST_BUSYD) THEN HOS43
    ELSE IF (!BURSTALLD & BRDTD) THEN HOS44
        ELSE IF (!BURSTALLD & !BRDTD) THEN HOS43
            ELSE HOIDLE:
```

```
.STATE HOS44:
    IF (BRDTD) THEN HOS44
    ELSE IF (!BURSTALLD) THEN HOS43
        ELSE HOIDLE:

.STATE HOS45:
    IF (HBGNTD) THEN HOS45
    ELSE IF (!CHIPSEL & CYCINPR) THEN HOS45
        ELSE HOS46:

.STATE HOS46:
    GOTO HOS6:

.STATE HOS47:
    IF (HBGNTD) THEN HOS47
    ELSE IF (!CHIPSEL & CYCINPR) THEN HOS47
        ELSE HOS48:

.STATE HOS48:
    GOTO HOS18:

.STATE HOS49:
    IF (HBGNTD) THEN HOS49
    ELSE IF (!CHIPSEL & CYCINPR) THEN HOS49
        ELSE HOS50:

.STATE HOS50:
    GOTO HOS30:

.STATE HOS51:
    IF (HBGNTD) THEN HOS51
    ELSE IF (!CHIPSEL & CYCINPR) THEN HOS51
    ELSE HOS52:

.STATE HOS52:
    GOTO HOS41:

.ENDSTATEMACHINE:

.END:
```

What is claimed is:

1. A work station, including a central processing unit (CPU), comprising:
   a first integrated circuit interface chip connected to an external bus;
   a second integrated circuit interface chip connected to a memory;
   a third integrated circuit interface chip connected to a peripheral unit; and
   a local bus connected to said CPU and chips, each of said chips including a plurality of operating units;
   wherein each chip includes
      an internal bus which interconnects said operating units disposed therein, and
      a burst mode control line for selected operating units,
   wherein each of said operating units
      has a predetermined priority for accessing said internal bus, and
      is able to generate a request for accessing said internal bus,
   whereby an operating unit obtaining access to said internal bus locks said internal bus for a plurality of operating cycles regardless of requests from any other operating unit if said burst mode control line is activated, during which data is transferred continuously in a burst mode over said internal bus without interruption.

2. A work station according to claim 1 wherein each chip is adapted to operate at the same clock frequency as said CPU, but with operational signals generated on its respective internal bus independently of said CPU.

3. A work station according to claim 2 wherein said external bus is adapted to transfer information at a frequency which is different from the operating frequency of said CPU.

4. A work station according to claim 1, wherein each internal bus includes data signal lines, address signal lines, operational unit identification lines and command signal lines.

5. A work station according to claim 4, wherein said first chip includes an internal arbiter, wherein the operating units of said first chip are assigned respective different priorities, and wherein each operating unit is adapted to transmit a bus request signal and a unit identification signal to said internal arbiter which in response is adapted to transmit a bus grant signal granting access to the internal bus to the requesting operating unit having the highest priority.

6. A work station according to claim 5, wherein the internal bus of said first chip includes a busy mode control line for each of the associated operating units, activation of a busy mode control line with an active busy mode signal indicating that the associated operating unit is busy.

7. A work station according to claim 6, wherein said active busy mode signal is effective, during a burst mode operation, to halt data transfer temporarily, while maintaining the burst mode condition.

8. A work station according to claim 5, wherein the internal bus of said first chip includes a valid signal line for each of the associated operating units, activation of the valid signal line indicating that the associated operating unit is presenting address signals, data signals and command signals on the internal bus.

9. A work station according to claim 5, wherein the internal bus of said first chip includes a destination busy signal line indicating that an addressed operating unit is in a busy condition.

10. A work station according to claim 5, wherein the internal bus of said first chip includes a retry signal line for each of the associated operating units which attempts to obtain access to another of said operating units which is currently busy, an active retry signal being effective to enable said internal arbiter to reorder the priority on said internal bus.

11. A work station according to claim 1, wherein said local bus is directly connected to said CPU and integrated circuit chips.

12. A work station according to claim 1, wherein the operating unit obtaining access to said internal bus can be interrupted by any other operating unit having a higher priority on an operating cycle-by-cycle basis, if said burst mode control line is not activated.

* * * * *

UNITED STATES PATENT AND TRADEMARK OFFICE
CERTIFICATE OF CORRECTION

PATENT NO. : 5,410,656
DATED : April 25, 1995
INVENTOR(S) : Edward King et al.

It is certified that error appears in the above-indentified patent and that said Letters Patent is hereby corrected as shown below:

Title Page, item [22], after "Filed:" delete "June 30, 1991" and substitute --August 30, 1991--.

Signed and Sealed this

Twenty-eighth Day of November 1995

Attest:

BRUCE LEHMAN

*Attesting Officer*     *Commissioner of Patents and Trademarks*